(12) United States Patent
Taherzadeh Boroujeni et al.

(10) Patent No.: US 11,799,604 B2
(45) Date of Patent: Oct. 24, 2023

(54) TECHNIQUES FOR ADAPTING A NUMBER OF TRACKING REFERENCE SIGNAL SYMBOLS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/371,195

(22) Filed: Jul. 9, 2021

(65) Prior Publication Data

US 2022/0060298 A1 Feb. 24, 2022

Related U.S. Application Data

(60) Provisional application No. 63/068,604, filed on Aug. 21, 2020.

(51) Int. Cl.
| | |
|---|---|
| *H04L 5/00* | (2006.01) |
| *H04W 24/08* | (2009.01) |
| *H04W 72/10* | (2009.01) |
| *H04W 72/23* | (2023.01) |

(52) U.S. Cl.
CPC .......... *H04L 5/0048* (2013.01); *H04W 24/08* (2013.01); *H04W 72/23* (2023.01)

(58) Field of Classification Search
CPC ...... H04L 5/0048; H04W 72/23; H04W 24/08
See application file for complete search history.

(56) References Cited

U.S. PATENT DOCUMENTS

| | | | |
|---|---|---|---|
| 2018/0262313 A1 | 9/2018 | Nam et al. | |
| 2019/0052377 A1 | 2/2019 | Hwang et al. | |
| 2019/0052443 A1 | 2/2019 | Cheng et al. | |

(Continued)

FOREIGN PATENT DOCUMENTS

| | | |
|---|---|---|
| WO | WO-2017050512 A1 | 3/2017 |
| WO | WO-2019067925 A1 | 4/2019 |
| WO | WO-2019099659 A1 | 5/2019 |

OTHER PUBLICATIONS

International Search Report and Written Opinion—PCT/US2021/041301—ISA/EPO—dated Oct. 18, 2021.

*Primary Examiner* — Ronald B Abelson
(74) *Attorney, Agent, or Firm* — Dalei Dong; Holland & Hart LLP

(57) ABSTRACT

Techniques for wireless communications are described. A user equipment (UE) may support techniques for adapting a number of tracking references signal symbols. For example, a UE may receive an indication of a set of tracking reference signal symbols. The set of tracking reference signal symbols may include one or more subset of tracking reference signal symbols. Each of the one or more subset of tracking reference signal symbols may include at least two or more tracking reference signal symbols. The UE may determine a number of tracking reference signal symbols based on the received indication, and measure a tracking reference signal based on the adjusted number of tracking reference signal symbols.

28 Claims, 17 Drawing Sheets

(56) References Cited

U.S. PATENT DOCUMENTS

| | | |
|---|---|---|
| 2019/0109750 A1 | 4/2019 | Nam et al. |
| 2019/0182091 A1* | 6/2019 | Bai .................. H04L 27/26134 |
| 2019/0215712 A1 | 7/2019 | Babaei et al. |
| 2019/0356444 A1 | 11/2019 | Noh et al. |
| 2020/0037269 A1* | 1/2020 | Ryu ....................... H04B 7/063 |
| 2020/0136767 A1 | 4/2020 | Ernstrom et al. |

* cited by examiner

TECHNIQUES FOR ADAPTING A NUMBER OF TRACKING REFERENCE SIGNAL SYMBOLS

CROSS REFERENCES

The present application for patent claims the benefit of U.S. Provisional Patent Application No. 63/068,604 by TAHERZADEH BOROUJENI et al., entitled "TECHNIQUES FOR ADAPTING A NUMBER OF TRACKING REFERENCE SIGNAL SYMBOLS," filed Aug. 21, 2020, assigned to the assignee hereof, and which is hereby incorporated by reference in its entirety.

FIELD OF DISCLOSURE

The present disclosure, for example, relates to wireless communications systems, and more specifically to techniques for adapting a number of tracking references signal symbols in the wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to configuring a communication device, such as a UE and a base station, for example, an eNodeB (eNB), a next-generation NodeB or a giga-NodeB (either of which may be referred to as a gNB) of wireless communication system to support adapting a number of tracking reference signal symbols to improve tracking reference signal-related operations. For example, a UE may be configured to increase or decrease a number of tracking reference signal symbols to use for tracking reference signal-related operations. In some examples, the UE may be configured to transmit a request message (e.g., to enable tracking reference signal coverage enhancement) to increase the number of tracking reference signal symbols. In some other examples, the UE may be configured to transmit a de-request message (e.g., to disable tracking reference signal coverage enhancement) to decrease the number of tracking reference signal symbols. The UE may receive a dynamic indication to adapt a number of tracking reference signal symbols, for example, based on transmitting an explicit indication to the base station, to improve tracking reference signal-related operations.

For example, the UE may receive a UE-specific downlink control information (DCI) message to adapt the number of tracking reference signal symbols. In some other examples, the UE may receive a group common DCI (GC-DCI) message to adapt the number of tracking reference signal symbols. In other examples, the UE may receive a medium access control-control element (MAC-CE) message to adapt the number of tracking reference signal symbols. The UE may be configured to adapt the number of tracking reference signal symbols with reference to a default tracking reference signal configuration, which may be semi-statically configured via radio resource control (RRC) signaling. By adapting a number of tracking reference signal symbols, the UE may experience power saving. The present disclosure may, as a result, also include improvements to tracking reference signal-related operations and, in some examples, may promote high reliability and low wireless communications, among other benefits.

A method of wireless communication at a UE is described. The method may include receiving an indication of a set of tracking reference signal symbols, the set of tracking reference signal symbols includes one or more subset of tracking reference signal symbols, each of the one or more subset of tracking reference signal symbols includes at least two or more tracking reference signal symbols, determining a number of tracking reference signal symbols based on the received indication, and measuring a tracking reference signal based on the adjusted number of tracking reference signal symbols.

An apparatus for wireless communication is described. The apparatus may include a processor, memory coupled with the processor, and instructions stored in the memory. The instructions may be executable by the processor to cause the apparatus to receive an indication of a set of tracking reference signal symbols, the set of tracking reference signal symbols includes one or more subset of tracking reference signal symbols, each of the one or more subset of tracking reference signal symbols includes at least two or more tracking reference signal symbols, determine a number of tracking reference signal symbols based on the received indication, and measure a tracking reference signal based on the adjusted number of tracking reference signal symbols.

Another apparatus for wireless communication is described. The apparatus may include means for receiving an indication of a set of tracking reference signal symbols, the set of tracking reference signal symbols includes one or more subset of tracking reference signal symbols, each of the one or more subset of tracking reference signal symbols includes at least two or more tracking reference signal symbols, determining a number of tracking reference signal symbols based on the received indication, and measuring a tracking reference signal based on the adjusted number of tracking reference signal symbols.

A non-transitory computer-readable medium storing code for wireless communication at a UE is described. The code may include instructions executable by a processor to receive an indication of a set of tracking reference signal symbols, the set of tracking reference signal symbols includes one or more subset of tracking reference signal symbols, each of the one or more subset of tracking reference signal symbols includes at least two or more tracking reference signal symbols, determine a number of tracking reference signal symbols based on the received indication, and measure a tracking reference signal based on the adjusted number of tracking reference signal symbols.

Some examples of the method, apparatuses, and non-transitory computer-readable medium described herein may further include operations, features, means, or instructions for determining a symbol index associated with each tracking reference signal symbol in the adjusted number of tracking reference signal symbols within a slot having a symbol index ranging from 0 to 14.

In some examples of the method, apparatuses, and non-transitory computer-readable medium described herein, the set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

In some examples of the method, apparatuses, and non-transitory computer-readable medium described herein, the set of tracking reference signal symbols includes a union of at least two subset of tracking reference signal symbols.

In some examples of the method, apparatuses, and non-transitory computer-readable medium described herein, a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10.

In some examples of the method, apparatuses, and non-transitory computer-readable medium described herein, a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

Some examples of the method, apparatuses, and non-transitory computer-readable medium described herein may further include operations, features, means, or instructions for determining a bit value associated with the received indication, and selecting the one or more subset of tracking reference signal symbols based on the determined bit value associated with the received indication, the one or more subset of tracking reference signal symbols each including at least two or more tracking reference signal symbols, where determining the number of tracking reference signal symbols may be based on the one or more selected subset of tracking reference signal symbols.

Some examples of the method, apparatuses, and non-transitory computer-readable medium described herein may further include operations, features, means, or instructions for switching from a primary tracking reference signal configuration to a secondary tracking reference signal configuration based on the indication, and where measuring the tracking reference signal may be based on switching from the primary tracking reference signal configuration to the secondary tracking reference signal configuration.

Some examples of the method, apparatuses, and non-transitory computer-readable medium described herein may further include operations, features, means, or instructions for determining one or more tracking reference signal parameters based on switching from the primary tracking reference signal configuration to the secondary tracking reference signal configuration, the one or more tracking reference signal parameters including a length of a tracking reference signal burst, a periodicity of the tracking reference signal burst, a number of symbols for a tracking reference signal transmission within a slot, a bandwidth part for the tracking reference signal transmission, a subcarrier spacing associated with the tracking reference signal transmission, or a symbol spacing associated with the tracking reference signal transmission, or any combination thereof, and where measuring the tracking reference signal may be based on the one or more determined tracking reference signal parameters.

Some examples of the method, apparatuses, and non-transitory computer-readable medium described herein may further include operations, features, means, or instructions for enabling a timer based on determining the number of tracking reference signal symbols.

Some examples of the method, apparatuses, and non-transitory computer-readable medium described herein may further include operations, features, means, or instructions for adjusting the number of tracking reference signal symbols to a default number of tracking reference signal symbols according to a default tracking reference signal configuration based on the timer lapsing.

Some examples of the method, apparatuses, and non-transitory computer-readable medium described herein may further include operations, features, means, or instructions for adjusting the number of tracking reference signal symbols to a default number of tracking reference signal symbols based on receiving a second indication.

Some examples of the method, apparatuses, and non-transitory computer-readable medium described herein may further include operations, features, means, or instructions for receiving a DCI message including the indication of the set of tracking reference signal symbol locations including the one or more subset of tracking reference signal symbol locations, and where determining the number of tracking reference signal symbol locations may be based on the received DCI message.

In some examples of the method, apparatuses, and non-transitory computer-readable medium described herein, the DCI message includes a UE-specific DCI message or a GC-DCI message associated with a group of UEs.

Some examples of the method, apparatuses, and non-transitory computer-readable medium described herein may further include operations, features, means, or instructions for receiving a MAC-CE message including the indication of the set of tracking reference signal symbol locations including the one or more subset of tracking reference signal symbol locations, and where determining the number of tracking reference signal symbol locations may be based on the received MAC-CE message.

Some examples of the method, apparatuses, and non-transitory computer-readable medium described herein may further include operations, features, means, or instructions for receiving an RRC message including a default tracking reference signal configuration of a default set of tracking reference signal symbols, the default set of tracking reference signal symbols including the one or more subset of tracking reference signal symbols, the one or more subset of tracking reference signal symbols each including at least two or more tracking reference signal symbols, and where determining the number of tracking reference signal symbols may be based on the received indication and the default tracking reference signal configuration.

Some examples of the method, apparatuses, and non-transitory computer-readable medium described herein may further include operations, features, means, or instructions for determining a tracking reference signal coverage condition, transmitting a request message to increase the number of tracking reference signal symbols based on the determined tracking reference signal coverage condition, and receiving a response message including the indication based on the transmitted request message to increase the number of tracking reference signal symbols, where determining the number of tracking reference signal symbols may be based on the received response message including the indication.

Some examples of the method, apparatuses, and non-transitory computer-readable medium described herein may further include operations, features, means, or instructions for determining a tracking reference signal coverage condition, transmitting a request message to decrease the number of tracking reference signal symbols based on the determined tracking reference signal coverage condition, and receiving a response message including the indication based on the transmitted request message to decrease the number of tracking reference signal symbols, where determining the number of tracking reference signal symbols may be based on the received response message including the indication.

Some examples of the method, apparatuses, and non-transitory computer-readable medium described herein may further include operations, features, means, or instructions for determining a first number of tracking reference signal symbols based on a default tracking reference signal configuration, determining a second number of tracking reference signal symbols based on the received indication, the first number of tracking reference signal symbols may be different from the second number of tracking reference signal symbols, and where measuring the tracking reference signal may be based on the second number of tracking reference signal symbols.

In some examples of the method, apparatuses, and non-transitory computer-readable medium described herein, the second number of tracking reference signal symbols may be greater than the first number of tracking reference signal symbols.

A method of wireless communication at a base station is described. The method may include allocating a set of tracking reference signal symbols including one or more subset of tracking reference signal symbols and transmitting an indication of the set of tracking reference signal symbols including the one or more subset of tracking reference signal symbols, the one or more subset of tracking reference signal symbols each including at least two or more tracking reference signal symbols.

An apparatus for wireless communication is described. The apparatus may include a processor, memory coupled with the processor, and instructions stored in the memory. The instructions may be executable by the processor to cause the apparatus to allocate a set of tracking reference signal symbols including one or more subset of tracking reference signal symbols and transmit an indication of the set of tracking reference signal symbols including the one or more subset of tracking reference signal symbols, the one or more subset of tracking reference signal symbols each including at least two or more tracking reference signal symbols.

Another apparatus for wireless communication is described. The apparatus may include means for allocating a set of tracking reference signal symbols including one or more subset of tracking reference signal symbols and transmitting an indication of the set of tracking reference signal symbols including the one or more subset of tracking reference signal symbols, the one or more subset of tracking reference signal symbols each including at least two or more tracking reference signal symbols.

A non-transitory computer-readable medium storing code for wireless communication at a base station is described. The code may include instructions executable by a processor to allocate a set of tracking reference signal symbols including one or more subset of tracking reference signal symbols and transmit an indication of the set of tracking reference signal symbols including the one or more subset of tracking reference signal symbols, the one or more subset of tracking reference signal symbols each including at least two or more tracking reference signal symbols.

In some examples of the method, apparatuses, and non-transitory computer-readable medium described herein, the set of tracking reference signal symbols includes a union of at least two subset of tracking reference signal symbols.

In some examples of the method, apparatuses, and non-transitory computer-readable medium described herein, a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10.

In some examples of the method, apparatuses, and non-transitory computer-readable medium described herein, a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

Some examples of the method, apparatuses, and non-transitory computer-readable medium described herein may further include operations, features, means, or instructions for assigning a bit value to the indication, the bit value corresponding to the one or more subset of tracking reference signal symbols.

Some examples of the method, apparatuses, and non-transitory computer-readable medium described herein may further include operations, features, means, or instructions for transmitting a DCI message including the indication of the set of tracking reference signal symbol locations including the one or more subset of tracking reference signal symbol locations.

In some examples of the method, apparatuses, and non-transitory computer-readable medium described herein, the DCI message includes a UE-specific DCI message or a GC-DCI message associated with a group of UEs.

Some examples of the method, apparatuses, and non-transitory computer-readable medium described herein may further include operations, features, means, or instructions for transmitting a MAC-CE message including the indication of the set of tracking reference signal symbol locations including the one or more subset of tracking reference signal symbol locations.

Some examples of the method, apparatuses, and non-transitory computer-readable medium described herein may further include operations, features, means, or instructions for transmitting an RRC message including a default tracking reference signal configuration of a default set of tracking reference signal symbols, the default set of tracking reference signal symbols including the one or more subset of tracking reference signal symbols.

Some examples of the method, apparatuses, and non-transitory computer-readable medium described herein may further include operations, features, means, or instructions for receiving a request message to increase a number of tracking reference signal symbols based on a tracking reference signal coverage condition, where allocating the set of tracking reference signal symbols may be based on the received request message, and transmitting a response message including the indication based on the received request message to increase the number of tracking reference signal symbols.

Some examples of the method, apparatuses, and non-transitory computer-readable medium described herein may further include operations, features, means, or instructions for receiving a request message to decrease a number of tracking reference signal symbols based on a tracking reference signal coverage condition, where allocating the set of tracking reference signal symbols may be based on the received request message, and transmitting a response message including the indication based on the received request message to decrease the number of tracking reference signal symbols.

In some examples of the method, apparatuses, and non-transitory computer-readable medium described herein, the set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

DETAILED DESCRIPTION

Figure 1:
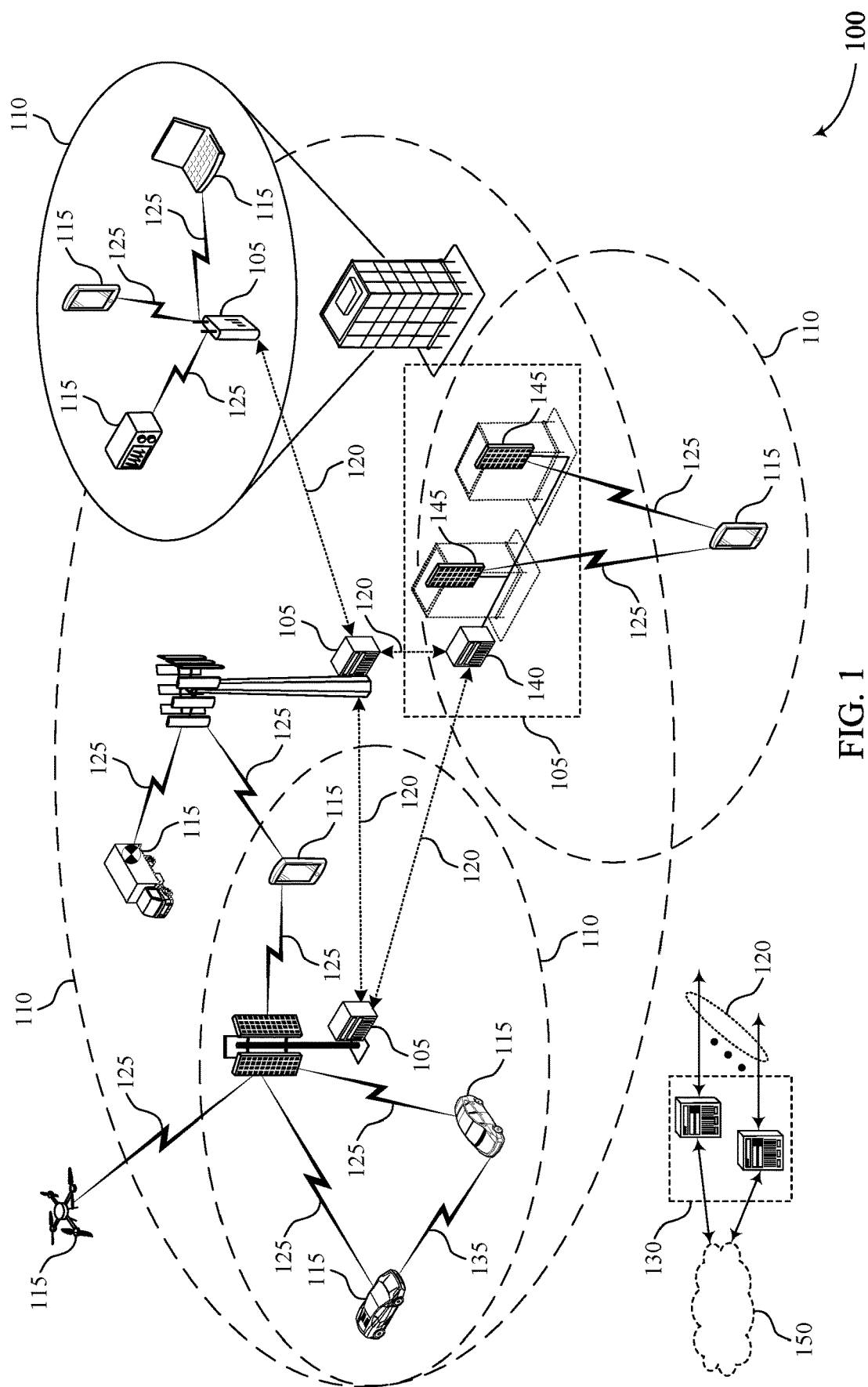
FIGS. 1 and 2 illustrate examples of wireless communications systems that support techniques for adapting a number of tracking reference signal symbols in accordance with various aspects of the present disclosure.

A wireless communications system may include communication devices, such as a UE and a base station (e.g., an eNB, a next-generation NodeB or a giga-NodeB, either of which may be referred to as a gNB, or some other base station), that support wireless communications over one or multiple radio access technologies. Examples of radio access technologies include 4G systems, such as LTE systems, and 5G systems, which may be referred to as NR systems. In the wireless communications system, a base station may transmit, and a UE may receive, tracking reference signals to improve wireless communications between the base station and the UE. For example, a UE may measure tracking reference signals to estimate and correct frequency and time variations. Additionally or alternatively, a UE may measure tracking reference signals to estimate a channel delay spread and a Doppler spread in the wireless communications system.

A UE may be preconfigured with a tracking reference signal configuration. For example, a base station may transmit, and the UE may receive, an RRC message carrying the tracking reference signal configuration. The tracking reference signal configuration may allocate frequency and time resources (e.g., at least two tracking reference signal symbols) for tracking reference signal-related operations. In some cases, the tracking reference signal symbols allocated to the UE may be insufficient and the UE may therefore have inadequate coverage for these tracking reference signal-related operations. For example, the UE may need additional frequency and time resources (e.g., additional tracking reference signal symbols) to perform the tracking reference signal-related operations.

Various aspects of the present disclosure relate to configuring a UE to support adapting a number of tracking reference signal symbols to improve tracking reference signal-related operations. The UE may receive, from the base station, a dynamic or semi-static indication to adapt a number of tracking reference signal symbols. For example, the UE may receive a UE-specific DCI message to adapt the number of tracking reference signal symbols. In some other examples, the UE may receive a GC-DCI message to adapt the number of tracking reference signal symbols. In other examples, the UE may receive a MAC-CE message to adapt the number of tracking reference signal symbols. The UE may be configured to adapt the number of tracking reference signal symbols with reference to a default tracking reference signal configuration, which may be semi-statically configured via RRC signaling.

Aspects of the present disclosure may be implemented to realize one or more of the following potential improvements, among others. The techniques employed by a UE may provide benefits and enhancements to the operation of the UE. For example, operations performed by the UE may provide improvements to tracking reference signal-related operations (e.g., channel delay estimation, Doppler spread estimation). In some examples, configuring the UE to support techniques for adapting a number of tracking reference signal symbols may promote high reliability and low latency wireless communications at the UE. In some other examples, configuring the UE to support techniques for adapting a number of tracking reference signal symbols may provide improvements to power consumption, spectral efficiency, and, in some examples, may promote high data rates and high data capacity for wireless communications at the UE, among other benefits.

Aspects of the disclosure are initially described in the context of wireless communications systems. Aspects of the present disclosure are then described with reference to tracking reference signal configurations and process flow related to techniques for adapting a number of tracking reference signal symbols. Aspects of the present disclosure are further illustrated by and described with reference to apparatus diagrams, system diagrams, and flowcharts that relate to techniques for adapting a number of tracking reference signal symbols.

FIG. 1 illustrates an example of a wireless communications system 100 that supports techniques for adapting a number of tracking reference signal symbols in accordance with various aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or a radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations. Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit one or more downlink reference signals to a UE 115. The base station 105 may, for example, transmit one or more channel state information (CSI) reference signals to the UE 115. The UE 115 may measure the one or more CSI reference signals to estimate a wireless channel (e.g., a physical downlink control channel (PDCCH), a physical downlink shared channel (PDSCH), etc.) between the base station 105 and the UE 115, and report channel quality information back to the base station 105. For example, a UE 115 may measure a reference signal received power (RSRP) or a reference signal received quality (RSRQ), or both, and report the measured RSRP or RSRQ, or both, to a base station 105.

In some examples, a base station 105 may transmit, to a UE 115, other downlink reference signals, such as one or more tracking reference signals, which may be an extension of CSI reference signals. For example, tracking reference signals may be configured as a CSI-RS resource set. The UE 115 may measure these one or more tracking reference signals to estimate a channel delay spread associated with wireless communications (e.g., downlink transmission, uplink transmissions) between the base station 105 and the UE 115. In some other examples, the UE 115 may measure the one or more tracking reference signals to estimate a Doppler spread associated with wireless communications (e.g., downlink transmission, uplink transmissions) between the base station 105 and the UE 115, in the wireless communication system 100.

A base station 105 may transmit, to a UE 115 or a group of UEs 115, tracking reference signals in a burst and over a radio frequency spectrum band. For example, a base station 105 may transmit, to a UE 115 or a group of UEs 115, a set of tracking reference signals over a radio frequency spectrum wideband. A tracking reference signal burst may correspond to one or more tracking reference signal parameters. For example, a UE 115 may receive a tracking reference signal burst according to one or more tracking reference signal parameters, which may include a tracking reference signal burst length (e.g., in terms of a number of slots) or a tracking reference signal burst periodicity (e.g., in terms of a number of slots). For example, for a sub-6 radio frequency spectrum band, a tracking reference signal burst length may be one or two slots. For above sub-6 radio frequency spectrum bands, a tracking reference signal burst length may also be one or two slots.

A tracking reference signal transmission may be configured to be periodic or aperiodic, or both. A periodic tracking reference signal transmission may include time and frequency resources with a same periodicity or bandwidth, or both. Examples of periodicity for periodic tracking reference signal transmissions include, but is not limited to, 10 ms, 20 ms, 40 ms, and 80 ms for a sub-6 radio frequency spectrum band or above sub-6 radio frequency spectrum bands, or both. An aperiodic tracking reference signal transmission may, in some examples, supplement or be in addition to a periodic tracking reference signal transmission. For example, when aperiodic tracking reference signal transmission is also configured, it provides additional instances of the periodic tracking reference signal transmission that can be triggered dynamically outside of the periodically occurring tracking reference signal transmissions (e.g., tracking reference signal occasions).

A base station 105 may, in some cases, transmit a synchronization signal including of a primary synchronization signal and a secondary synchronization signal. These synchronization signals, together with a physical broadcast channel (PBCH), are jointly referred to as a synchronization signal block (SSB) or SS block. A tracking reference signal transmission may, in some examples, be configured on a carrier or on an active bandwidth part when an SS block is absent (i.e., not present). An active bandwidth part may be characterized by a numerology (e.g., a subcarrier spacing and a cyclic prefix) and a set of consecutive time and frequency resources (e.g., resource blocks) in the numerology of the bandwidth part. One or more tracking reference signal parameters may define a tracking reference signal bandwidth in terms of a number of resource blocks for a sub-6 radio frequency spectrum band or above sub-6 radio frequency spectrum bands, or both. For example, a bandwidth part of 50 resource blocks, or for periodicities of 20 ms and above, for 10 ms periodicity: 50 resource blocks. Additionally, or alternatively, one or more tracking reference signal parameters may define a tracking reference signal subcarrier spacing (e.g., four subcarrier spacing) or a tracking reference signal symbol spacing within a slot (e.g., four symbol spacing).

A tracking reference signal transmission may, in some examples, be configured to be quasi co-located with another downlink reference signal. For example, a tracking reference signal transmission can be quasi co-located with a demodulation reference signal (DMRS) (e.g., a PDSCH DMRS). A base station 105 may quasi co-locate a tracking reference signal and DMRS transmission when the UE 115 is estimating at least a delay spread, an average delay, a Doppler shift and Doppler spread. For example, a tracking reference signal transmitted on a first antenna port and a DMRS transmitted on a second antenna port respectively, experience common radio channel properties (e.g., a Doppler spread). The first antenna port and the second antenna port are thereby referred to be quasi co-located antenna ports and, the tracking reference signal and the DMRS are referred to be quasi co-located signals.

A base station 105 may generate a tracking reference signal sequence based on a sequence generation procedure. For example, a base station 105 may select a pseudo noise sequence (or a pseudo-random-noise sequence) and generate a tracking reference signal sequence using the pseudo noise sequence (or the pseudo-random-noise sequence). A pseudo noise sequence (or a pseudo-random-noise sequence) has a spectrum similar to a random sequence of bits. Examples of pseudo noise sequence may include, but is not limited to, maximal length sequences, Gold sequences, Kasami sequences, and Barker sequences.

In the wireless communication system 100, a UE 115 may operate in at least one mode (also referred to as RRC mode). In some examples, a UE 115 may operate in an idle mode (also referred to as RRC idle mode). In some other examples, a UE 115 may operate in an inactive mode (also referred to as RRC inactive mode). In other examples, a UE 115 may operate in a connected mode (also referred to as RRC connected mode). When operating in the connected mode, the UE 115 may receive, and the base station 105 may transmit, an RRC configuration message (e.g., a UE-specific RRC configuration message), which may include a tracking reference signal configuration for one or more radio frequency spectrum bands (e.g., a sub-6 radio frequency spectrum band, or above sub-6 radio frequency spectrum bands, or both).

A tracking reference signal configuration may allocate at least two tracking reference signal symbols per slot. A UE 115 may determine tracking reference signal symbol locations per slot based at least in part on a symbol index. In some examples, a base station 105 may, based at least in part on the tracking reference signal configuration, allocate a fourth symbol and an eighth symbol per slot for tracking reference signals. In some other examples, a base station 105 may, based at least in part on the tracking reference signal configuration, allocate a fifth symbol and a ninth symbol per slot for tracking reference signals. In other examples, a base station 105 may, based at least in part on the tracking reference signal configuration, allocate a sixth symbol and a tenth symbol per slot for tracking reference signals. A tracking reference signal transmission of a tracking reference signal burst may have a same symbol position in each slot.

A UE 115 may, in some examples, have insufficient coverage (e.g., not enough allocated time and frequency resources for tracking reference signal-related operations). A higher density or more time and frequency resources for tracking reference signal may thus be needed for reliable frequency and time tracking and estimation of channel delay spread and Doppler spread by the UE 115. Various aspects of the present disclosure relate to configuring a UE 115 to support adapting a number of tracking reference signal symbols to improve tracking reference signal-related operations. The UE 115 may receive, from a base station 105, a dynamic or semi-static indication to adapt a number of tracking reference signal symbols. For example, the UE 115 may receive a UE-specific DCI message to adapt the number of tracking reference signal symbols. In some other examples, the UE 115 may receive a GC-DCI message to adapt the number of tracking reference signal symbols. In other examples, the UE 115 may receive a MAC-CE message to adapt the number of tracking reference signal symbols. The UE 115 may be configured to adapt the number of tracking reference signal symbols with reference to a default tracking reference signal configuration, which may be semi-statically configured via RRC signaling. By adapting a number of tracking reference signal symbols, the UE 115 may experience power saving. The present disclosure may, as a result, also include improvements to tracking reference signal-related operations and, in some examples, may promote high reliability and low wireless communications, among other benefits.

Figure 2:
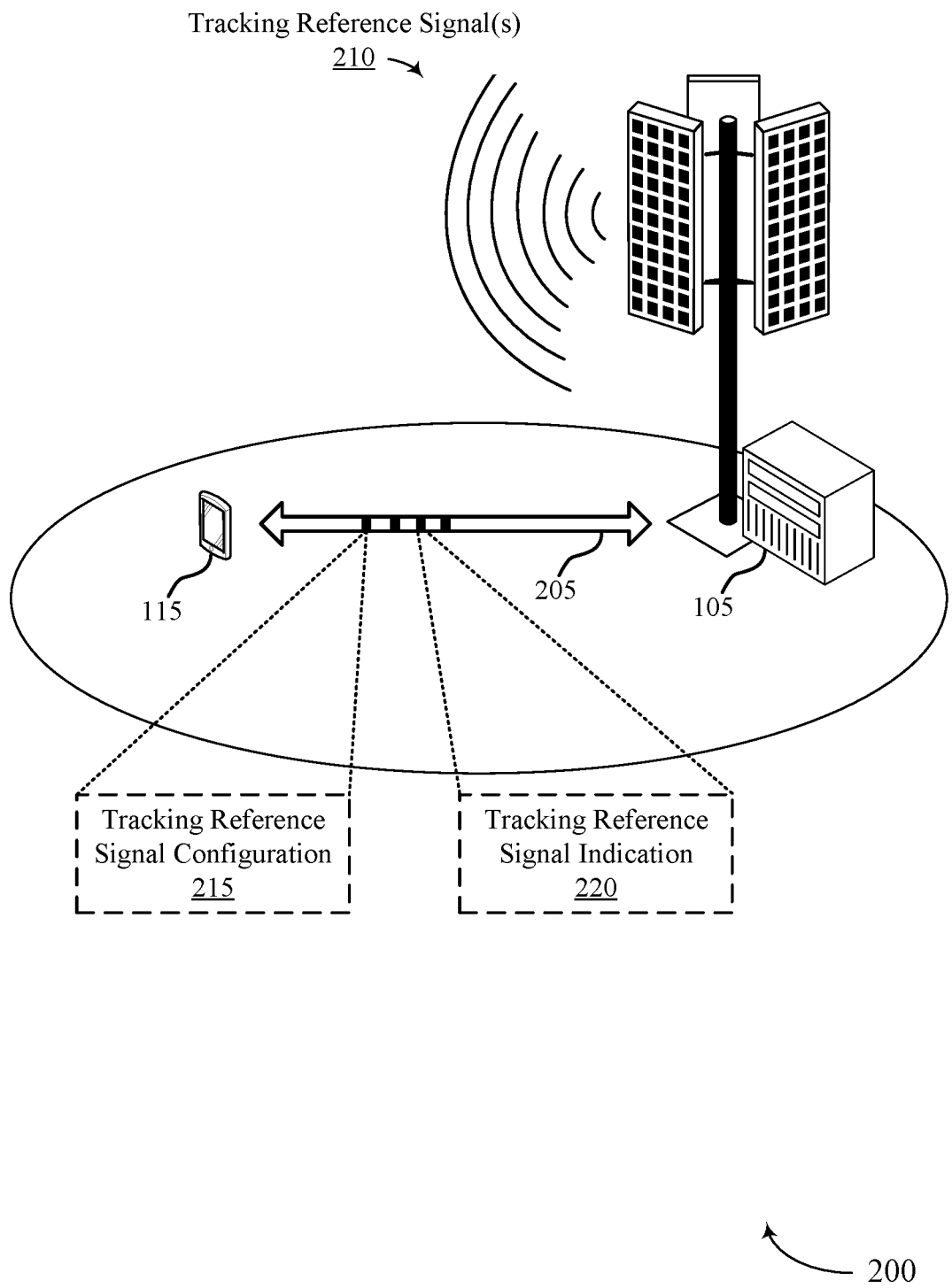

FIG. 2 illustrates an example of a wireless communications system 200 that supports techniques for adapting a number of tracking reference signal symbols in accordance with various aspects of the present disclosure. The wireless communications system 200 may implement aspects of the wireless communications system 100. For example, the wireless communications system 200 may include a base station 105 and a UE 115, which may be examples of a base station 105 and a UE 115 as described with reference to FIG. 1. The wireless communications system 200 may support multiple radio access technologies including 4G systems such as LTE systems, LTE-A systems, or LTE-A Pro systems, and 5G systems which may be referred to as NR systems. The wireless communications system 200 may include features for improvements to power savings and, in some examples, may promote high reliability and low latency channel estimation operations (e.g., a delay spread, an average delay, a Doppler shift and Doppler spread), among other benefits.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The base station 105 and the UE 115 may thus be configured to support wireless communications (e.g., downlink transmissions, uplink transmission) over a communication link 205 using one or multiple antennas.

The base station 105 may transmit, and the UE 115 may receive, one or more downlink reference signals using one or multiple antennas. The base station 105 may, for example, transmit one or more one or more tracking reference signals 210, which may be an extension of CSI reference signals. The UE 115 may measure these one or more tracking reference signals 210 to estimate a channel delay spread associated with wireless communications (e.g., downlink transmission, uplink transmissions) between the base station 105 and the UE 115. In some other examples, the UE 115 may measure the one or more tracking reference signals to estimate a Doppler spread associated with wireless communications (e.g., downlink transmission, uplink transmissions) between the base station 105 and the UE 115, in the wireless communications system 200.

The base station 105 may configure the UE 115 with a tracking reference signal configuration 215, which may assign one or more symbols in a slot for tracking reference signal transmission and reception. In some cases, the tracking reference signal configuration 215 may allocate at least two tracking reference signal symbols in a time domain (e.g., a slot). A UE 115 may determine tracking reference signal symbol locations based at least in part on a symbol index. In some examples, the tracking reference signal configuration 215 may configure a fourth symbol and an eighth symbol in a slot for tracking reference signals 210. In some other examples, the tracking reference signal configuration 215 may configure a fifth symbol and a ninth symbol in a slot for tracking reference signals. In other examples, the tracking reference signal configuration 215 may configure a sixth symbol and a tenth symbol in a slot for tracking reference signals.

The UE 115 may, in some cases, not have enough coverage (e.g., allocated time and frequency resources) for tracking reference signals to perform channel estimation operations (e.g., a delay spread, an average delay, a Doppler shift and Doppler spread). As a result, a reliability and efficiency of wireless communications between the base station 105 and the UE 115, in the wireless communication system 100, may be impacted (e.g., reduced reliability, increased retransmissions). Various aspects of the present disclosure relate to configuring the UE 115 to support adapting a number of tracking reference signal symbols to improve tracking reference signal-related operations. The UE 115 may be configured to increase or decrease a number of tracking reference signal symbols to use for tracking reference signal-related operations. In some examples, the UE 115 may be configured to transmit a request message (e.g., to enable tracking reference signal coverage enhancement) to increase the number of tracking reference signal symbols. In some other examples, the UE 115 may be configured to transmit a de-request message (e.g., to disable tracking reference signal coverage enhancement) to decrease the number of tracking reference signal symbols.

The UE 115 may receive, from the base station 105, a tracking reference signal indication 220 via dynamic or semi-static signaling to adapt a number of tracking reference signal symbols. For example, the UE 115 may receive a UE-specific DCI message to adapt the number of tracking reference signal symbols. In some other examples, the UE 115 may receive a GC-DCI message to adapt the number of tracking reference signal symbols. In other examples, the UE 115 may receive a MAC-CE message to adapt the number of tracking reference signal symbols. In some examples, the UE 115 may receive, from the base station 105, a tracking reference signal indication 220 based at least in part on transmitting an explicit indication (e.g., a request message (e.g., to enable tracking reference signal coverage enhancement) or a de-request message (e.g., to disable tracking reference signal coverage enhancement)) to the base station 105.

The tracking reference signal indication 220 may identify a set of tracking reference signal symbols. The set of tracking reference signal symbols may include one or more subset of tracking reference signal symbols. Each of the one or more subset of tracking reference signal symbols includes at least two or more tracking reference signal symbols. For example, a first subset of tracking reference signal symbols may correspond to a fourth symbol and an eighth symbol in a slot, a second subset of tracking reference signal symbols may correspond to a fifth symbol and a ninth symbol in a slot, and a third subset of tracking reference signal symbol may correspond to a sixth symbol and a tenth symbol in a slot. In some examples, the set of tracking reference signal may be a combination of two or more subset of tracking reference signal symbols to provide coverage enhancement for tracking reference signals. For example, set of tracking reference signal may be a union of at least two subset of tracking reference signal symbols, as described and shown in FIGS. 4A through 4C.

The tracking reference signal indication 220 may include one or more bits, which the UE 115 may use to determine the set of tracking reference signal symbols. For example, the tracking reference signal indication 220 may include two bits that may indicate for the UE 115 to use the first subset of tracking reference signal symbols, the second subset tracking reference signal symbols, or the third subset of tracking reference signal symbols, or any combination thereof. In some examples, the set of tracking reference signal symbols may be indicated in reference to a default tracking reference signal configuration, such as a tracking reference signal configuration configured via RRC configuration. For example, if subset [x] is configured for the tracking reference signal configuration 215, where x=1, 2, and 3, one or more bits (e.g., two bits) in the tracking reference signal indication 220 (e.g., dynamic signaling) may indicate {subset[x], subset [x+1]}, {subset[x], subset [x+2]} or {subset[x], subset[x+1], subset[x+2]}. The addition operation may be a modulo 3 operation (i.e., 3+1=1).

The base station 105 or the UE 115, or both, may enable a timer based at least in part on adapting the number of tracking reference signal symbols. The dynamic signaling of tracking reference signal configuration switching or a set of tracking reference signal symbols may be valid until another dynamic signaling or an expiration based on the timer (e.g., a predefined or a preconfigured timer). The set of tracking reference signal symbols or other parameters associated with the tracking reference signals 210 may be changed implicitly via another dynamic signaling (e.g., and indication of coverage enhancement according to a pre-configuration.

The UE 115 may be configured to switch between a primary tracking reference signal configuration to a secondary tracking reference signal configuration based at least in part on the tracking reference signal indication 220. A primary tracking reference signal configuration may include a set of tracking reference signal parameters, which may correspond to a default number of tracking reference signal symbols. A secondary tracking reference signal configuration may include a set of tracking reference signal parameters, which may correspond to an increased or decreased number of tracking reference signal symbols. As described in FIG. 1, tracking reference signal parameters may include, but is not limited to, a tracking reference signal subcarrier spacing, a tracking reference signal symbol spacing, etc. The UE 115 may thus switch to an active tracking reference signal configuration (e.g., a primary or a secondary tracking reference signal configuration) based on the tracking reference signal indication 220 (e.g., via dynamic signaling).

Therefore, in the wireless communications system 200, the base station 105 and the UE 115 may support adapting a number of tracking reference signal symbols. The UE 115 may, as a result, experience power saving because the UE 115 may be allocated sufficient tracking reference signal resources for channel estimation (e.g., a delay spread, an average delay, a Doppler shift and Doppler spread). The wireless communications system 200 may, as a result, also include improvements to channel estimation operations for the UE 115 and, in some examples, may promote high reliability and low latency wireless communications for the UE 115, among other benefits.

Figure 3A:
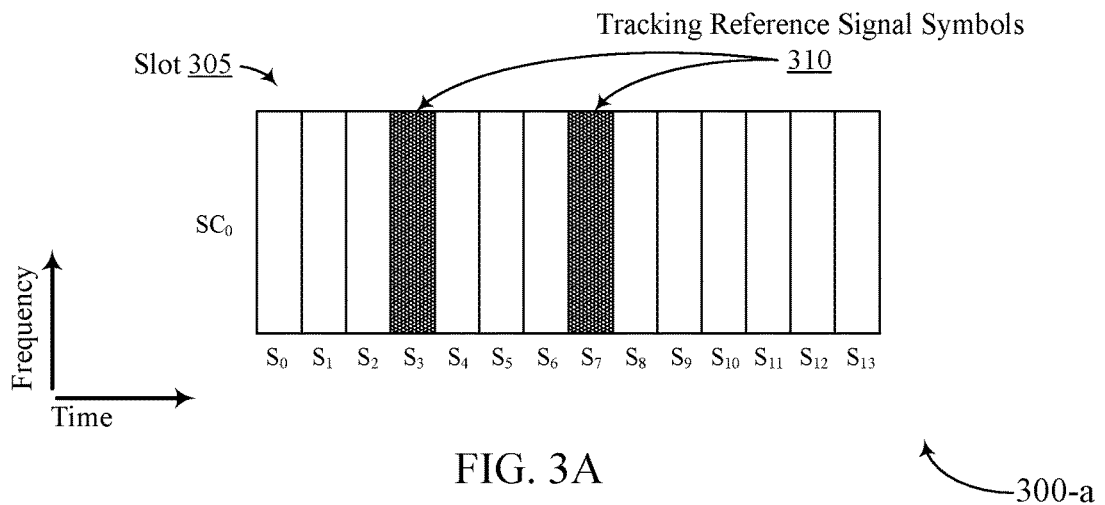
FIGS. 3A through 3C illustrate examples of tracking reference signal resource configurations that support techniques for adapting a number of tracking reference signal symbols in accordance with various aspects of the present disclosure.

FIG. 3A illustrates an example of a tracking reference signal resource configuration 300-$a$ that supports techniques for adapting a number of tracking reference signal symbols in accordance with various aspects of the present disclosure. The tracking reference signal resource configuration 300-$a$ may implement or may be implemented by aspects of the wireless communications systems 100 and 200 as described with reference to FIGS. 1 and 2. respectively. The tracking reference signal resource configuration 300-$a$ may be based on a configuration by a base station 105, and implemented by a UE 115. The tracking reference signal resource configuration 300-$a$ may configure time resources (for example, symbols, minislots, slots) as well as frequency resources (for example, carriers, subcarriers). A base station 105 may allocate at least one subcarrier (e.g., $SC_0$) and at least one symbol in a slot 305 for tracking reference signals. A slot may span fourteen symbols in a time domain (e.g., $S_0$ through $S_{13}$).

In the example of FIG. 3A, a base station 105 may allocate at least two symbols for tracking reference signals. These symbols may be referred to as tracking reference signal symbols 310. For example, a base station 105 may allocate a fourth symbol (e.g., $S_3$) and an eighth symbol (e.g., $S_7$) in the slot 305 for tracking reference signals. A UE 115 may determine tracking reference signal symbol locations in the slot 305 based at least in part on symbol indices included in the tracking reference signal resource configuration 300-$a$. For example, a UE 115 may receive the tracking reference signal resource configuration 300-$a$, as part of an RRC configuration message, and determine one or more symbol indices related to tracking reference signal symbol locations in the slot 305 based at least in part on a bitmap in the RRC configuration message, or a similar indication. The UE 115 may thereby monitor the fourth symbol (e.g., $S_3$) and the eighth symbol (e.g., $S_7$) in the slot 305 for measuring tracking reference signals.

Figure 3B:
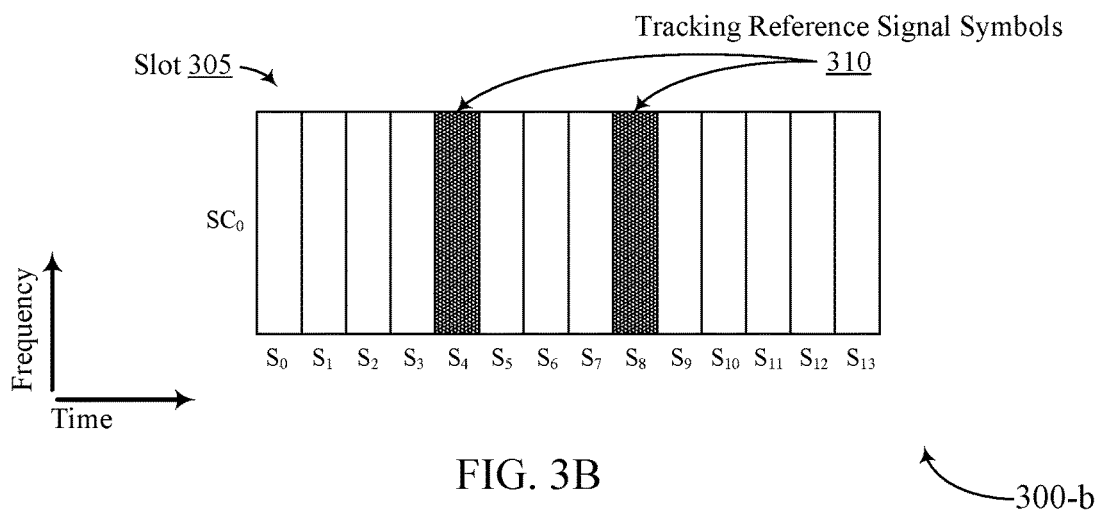

FIG. 3B illustrates an example of a tracking reference signal resource configuration 300-*b* that supports techniques for adapting a number of tracking reference signal symbols in accordance with various aspects of the present disclosure. The tracking reference signal resource configuration 300-*b* may implement or may be implemented by aspects of the wireless communications systems 100 and 200 as described with reference to FIGS. 1 and 2. respectively. The tracking reference signal resource configuration 300-*b* may be based on a configuration by a base station 105, and implemented by a UE 115. The tracking reference signal resource configuration 300-*b* may configure time resources (for example, symbols, minislots, slots) as well as frequency resources (for example, carriers, subcarriers). A base station 105 may allocate at least one subcarrier (e.g., $SC_0$) and at least one symbol in a slot 305 for tracking reference signals. A slot may span fourteen symbols in a time domain (e.g., $S_0$ through $S_{13}$).

In the example of FIG. 3B, a base station 105 may allocate at least two symbols for tracking reference signals. These symbols may be referred to as tracking reference signal symbols 310. For example, a base station 105 may allocate a fifth symbol (e.g., $S_4$) and a ninth symbol (e.g., $S_8$) in the slot 305 for tracking reference signals. A UE 115 may determine tracking reference signal symbol locations in the slot 305 based at least in part on symbol indices included in the tracking reference signal resource configuration 300-*b*. For example, a UE 115 may receive the tracking reference signal resource configuration 300-*b*, as part of an RRC configuration message, and determine one or more symbol indices related to tracking reference signal symbol locations in the slot 305 based at least in part on a bitmap in the RRC configuration message, or a similar indication. The UE 115 may thereby monitor the fifth symbol (e.g., $S_4$) and the ninth symbol (e.g., $S_8$) in the slot 305 for measuring tracking reference signals.

Figure 3C:
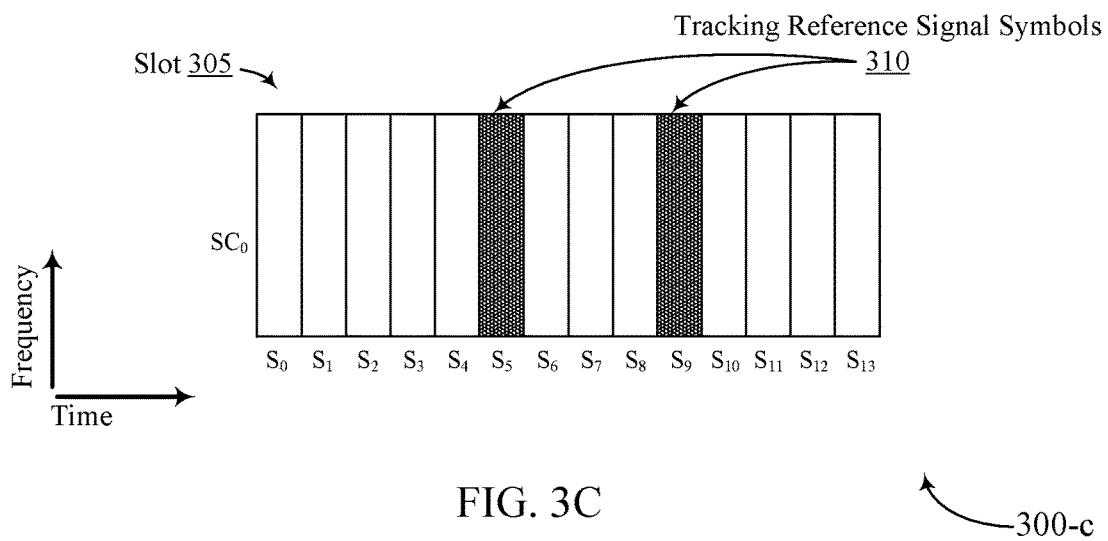

FIG. 3C illustrates an example of a tracking reference signal resource configuration 300-*c* that supports techniques for adapting a number of tracking reference signal symbols in accordance with various aspects of the present disclosure. The tracking reference signal resource configuration 300-*c* may implement or may be implemented by aspects of the wireless communications systems 100 and 200 as described with reference to FIGS. 1 and 2. respectively. The tracking reference signal resource configuration 300-*c* may be based on a configuration by a base station 105, and implemented by a UE 115. The tracking reference signal resource configuration 300-*c* may configure time resources (for example, symbols, minislots, slots) as well as frequency resources (for example, carriers, subcarriers). A base station 105 may allocate at least one subcarrier (e.g., $SC_0$) and at least one symbol in a slot 305 for tracking reference signals. A slot may span fourteen symbols in a time domain (e.g., $S_0$ through $S_{13}$).

In the example of FIG. 3C, a base station 105 may allocate at least two symbols for tracking reference signals. These symbols may be referred to as tracking reference signal symbols 310. For example, a base station 105 may allocate a sixth symbol (e.g., $S_5$) and a tenth symbol (e.g., $S_9$) in the slot 305 for tracking reference signals. A UE 115 may determine tracking reference signal symbol locations in the slot 305 based at least in part on symbol indices included in the tracking reference signal resource configuration 300-*c*. For example, a UE 115 may receive the tracking reference signal resource configuration 300-*c*, as part of an RRC configuration message, and determine one or more symbol indices related to tracking reference signal symbol locations in the slot 305 based at least in part on a bitmap in the RRC configuration message, or a similar indication. The UE 115 may thereby monitor the sixth symbol (e.g., $S_5$) and the tenth symbol (e.g., $S_9$) in the slot 305 for measuring tracking reference signals.

Figure 4A:
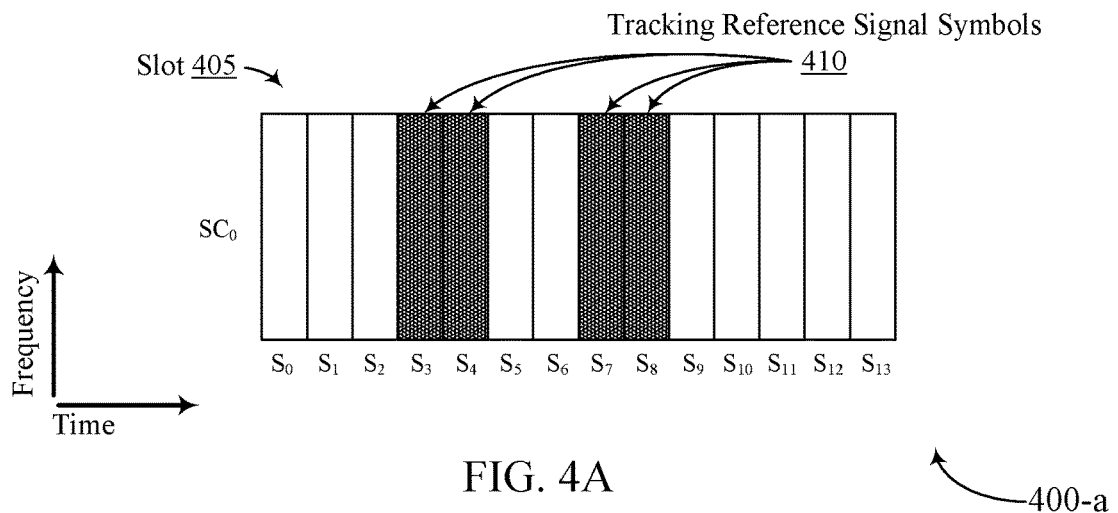
FIGS. 4A through 4C illustrate examples of tracking reference signal resource configurations that support techniques for adapting a number of tracking reference signal symbols in accordance with various aspects of the present disclosure.

FIG. 4A illustrates an example of a tracking reference signal resource configuration 400-*a* that supports techniques for adapting a number of tracking reference signal symbols in accordance with various aspects of the present disclosure. The tracking reference signal resource configuration 400-*a* may implement or may be implemented by aspects of the wireless communications systems 100 and 200 as described with reference to FIGS. 1 and 2. respectively. The tracking reference signal resource configuration 400-*a* may implement or may be implemented by aspects of the tracking reference signal resource configuration 300-*a* through 300-*c* as described with reference to FIGS. 3A through 3C. respectively. The tracking reference signal resource configuration 400-*a* may be based on a configuration by a base station 105, and implemented by a UE 115, and may promote higher reliability and lower latency channel estimation (e.g., a delay spread, an average delay, a Doppler shift and Doppler spread) in a wireless communications system. The tracking reference signal resource configuration 400-*a* may also be based on a configuration by the base station 105, and implemented by the UE 115 to decrease power consumption by the UE 115, if performing channel estimation operations, among other benefits.

The tracking reference signal resource configuration 400-*a* may configure time resources (for example, symbols, minislots, slots) as well as frequency resources (for example, carriers, subcarriers). A base station 105 may allocate at least one subcarrier (e.g., $SC_0$) and at least one symbol in a slot 405 for tracking reference signals. A slot may span fourteen symbols in a time domain (e.g., $S_0$ through $S_{13}$). In the example of FIG. 4A, a base station 105 may allocate a set of symbols for tracking reference signals to improve tracking reference signal coverage for a UE 115. The set may include a combination (e.g., a union) of at least two subset of symbols for tracking reference signals. Each subset may include at least two symbols for tracking reference signals. These symbols may be referred to as tracking reference signal symbols 410.

For example, a base station 105 may allocate a fourth symbol (e.g., $S_3$) and an eighth symbol (e.g., $S_7$) associated with a first subset of symbols for tracking reference signals (e.g., as shown in FIG. 3A), as well as a fifth symbol (e.g., $S_4$) and a ninth symbol (e.g., $S_8$) associated with a second subset of symbols for tracking reference signals (e.g., as shown in FIG. 3B). A UE 115 may determine tracking reference signal symbol locations in the slot 405 based at least in part on symbol indices included in the tracking reference signal resource configuration 400-*a*. For example, a UE 115 may receive the tracking reference signal resource configuration 400-*a*, as part of a semi-static message (e.g., an RRC message) or a dynamic message (e.g., a DCI message, a MAC-CE message, etc.), and determine one or more symbol indices related to tracking reference signal symbol locations in the slot 405 based at least in part on an indication in the semi-static message or the dynamic message. The UE 115 may thereby monitor the fourth symbol (e.g., $S_3$), the eighth symbol (e.g., $S_7$), the fifth symbol (e.g., $S_4$) and the ninth symbol (e.g., $S_8$), in the slot 405, for measuring tracking reference signals.

A UE 115 may thus have an increased number of symbols allocated for tracking reference signals, and thereby improve tracking reference signal coverage for the UE 115. As described with reference to FIG. 2, in some examples, a UE 115 may revert back to a default tracking reference signal configuration based at least in part on receiving an indication (e.g., via dynamic signaling) from a base station 105, or an expiration of a timer (e.g., a preconfigured timer), or a combination thereof. For example, a UE 115 may return to measuring tracking reference signals based at least in part on a tracking reference signal configuration (e.g., as shown in FIGS. 3A through 3C) having a decreased number of tracking reference signal symbols compared to the tracking reference signal resource configuration 400-a.

Although FIG. 4A illustrates a union between, for example, at least two tracking reference signal configurations (e.g., the tracking reference signal resource configuration 300-a as shown in FIG. 3A and the tracking reference signal resource configuration 300-b shown in FIG. 3B), other examples are possible and supported by the present disclosure. Additionally, while FIG. 4A illustrates a union between at least two tracking reference signal configurations (e.g., the tracking reference signal resource configuration 300-a as shown in FIG. 3A and the tracking reference signal resource configuration 300-b shown in FIG. 3B), other examples are possible and supported by the present disclosure in which more than two tracking reference signal configurations are combined to provide enhancements to tracking reference signal coverage for a UE 115.

Figure 4B:
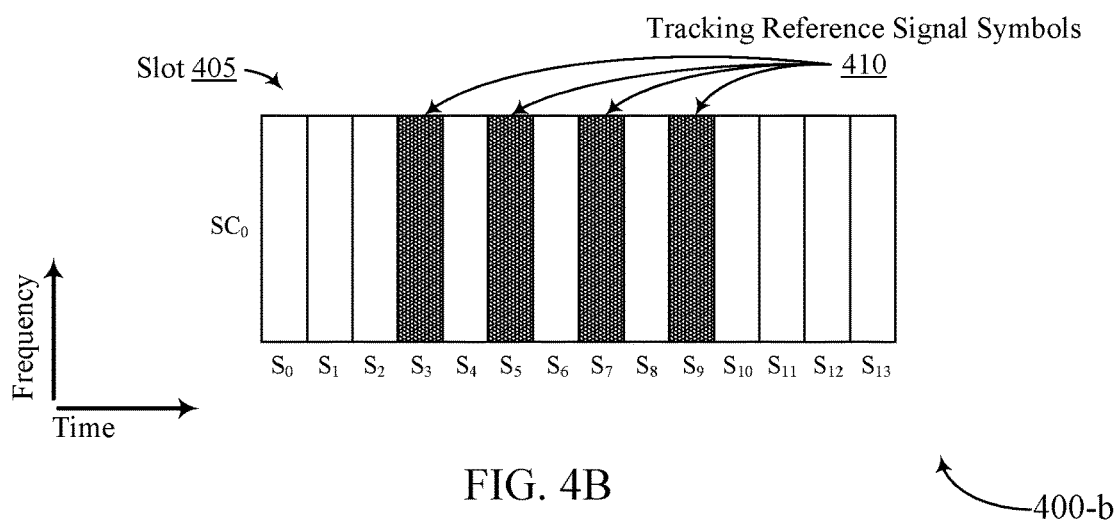

FIG. 4B illustrates an example of a tracking reference signal resource configuration 400-b that supports techniques for adapting a number of tracking reference signal symbols in accordance with various aspects of the present disclosure. The tracking reference signal resource configuration 400-b may implement or may be implemented by aspects of the wireless communications systems 100 and 200 as described with reference to FIGS. 1 and 2. respectively. The tracking reference signal resource configuration 400-b may implement or may be implemented by aspects of the tracking reference signal resource configuration 300-a through 300-c as described with reference to FIGS. 3A through 3C. respectively. The tracking reference signal resource configuration 400-b may be based on a configuration by a base station 105, and implemented by a UE 115, and may promote higher reliability and lower latency channel estimation (e.g., a delay spread, an average delay, a Doppler shift and Doppler spread) in a wireless communications system. The tracking reference signal resource configuration 400-b may also be based on a configuration by the base station 105, and implemented by the UE 115 to decrease power consumption by the UE 115, if performing channel estimation operations, among other benefits.

The tracking reference signal resource configuration 400-b may configure time resources (for example, symbols, minislots, slots) as well as frequency resources (for example, carriers, subcarriers). A base station 105 may allocate at least one subcarrier (e.g., $SC_0$) and at least one symbol in a slot 405 for tracking reference signals. A slot may span fourteen symbols in a time domain (e.g., $S_0$ through $S_{13}$). In the example of FIG. 4B, a base station 105 may allocate a set of symbols for tracking reference signals to improve tracking reference signal coverage for a UE 115. The set may include a combination (e.g., a union) of at least two subset of symbols for tracking reference signals. Each subset may include at least two symbols for tracking reference signals. These symbols may be referred to as tracking reference signal symbols 410.

For example, a base station 105 may allocate a fourth symbol (e.g., $S_3$) and an eighth symbol (e.g., $S_7$) associated with a first subset of symbols for tracking reference signals (e.g., as shown in FIG. 3A), as well as a sixth symbol (e.g., $S_5$) and a tenth symbol (e.g., $S_9$) associated with a second subset of symbols for tracking reference signals (e.g., as shown in FIG. 3C). A UE 115 may determine tracking reference signal symbol locations in the slot 405 based at least in part on symbol indices included in the tracking reference signal resource configuration 400-b. For example, a UE 115 may receive the tracking reference signal resource configuration 400-b, as part of a semi-static message (e.g., an RRC message) or a dynamic message (e.g., a DCI message, a MAC-CE message, etc.), and determine one or more symbol indices related to tracking reference signal symbol locations in the slot 405 based at least in part on an indication in the semi-static message or the dynamic message. The UE 115 may thereby monitor the fourth symbol (e.g., $S_3$), the eighth symbol (e.g., $S_7$), the sixth symbol (e.g., $S_5$) and the tenth symbol (e.g., $S_9$), in the slot 405, for measuring tracking reference signals.

A UE 115 may thus have an increased number of symbols allocated for tracking reference signals, and thereby improve tracking reference signal coverage for the UE 115. As described with reference to FIG. 2, in some examples, a UE 115 may revert back to a default tracking reference signal configuration based at least in part on receiving an indication (e.g., via dynamic signaling) from a base station 105, or an expiration of a timer (e.g., a preconfigured timer), or a combination thereof. For example, a UE 115 may return to measuring tracking reference signals based at least in part on a tracking reference signal configuration (e.g., as shown in FIGS. 3A through 3C) having a decreased number of tracking reference signal symbols compared to the tracking reference signal resource configuration 400-b.

Although FIG. 4B illustrates a union between, for example, at least two tracking reference signal configurations (e.g., the tracking reference signal resource configuration 300-a as shown in FIG. 3A and the tracking reference signal resource configuration 300-c shown in FIG. 3C), other examples are possible and supported by the present disclosure. Additionally, while FIG. 4B illustrates a union between at least two tracking reference signal configurations (e.g., the tracking reference signal resource configuration 300-a as shown in FIG. 3A and the tracking reference signal resource configuration 300-c shown in FIG. 3C), other examples are possible and supported by the present disclosure in which more than two tracking reference signal configurations are combined to provide enhancements to tracking reference signal coverage for a UE 115.

Figure 4C:
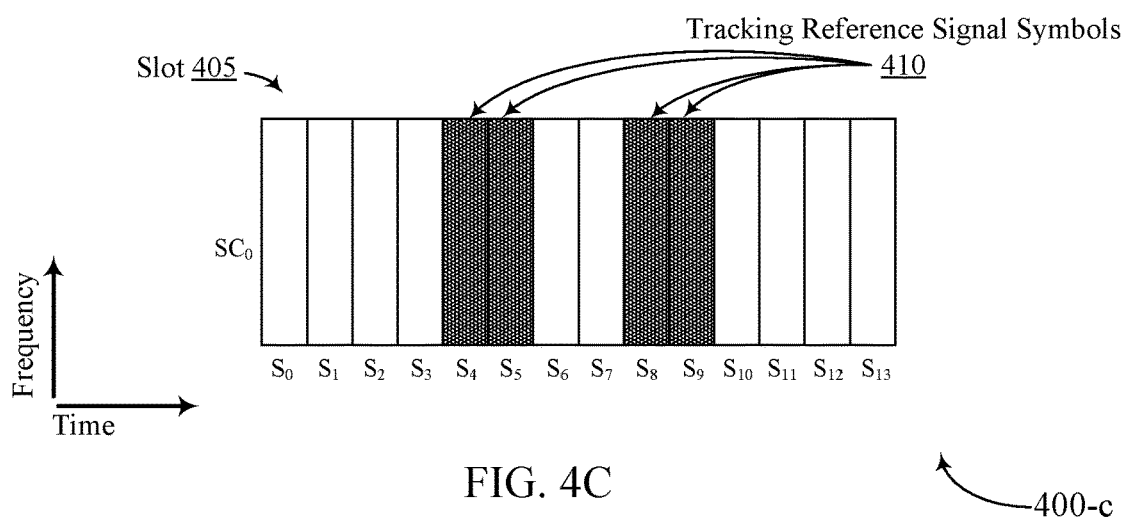

FIG. 4C illustrates an example of a tracking reference signal resource configuration 400-c that supports techniques for adapting a number of tracking reference signal symbols in accordance with various aspects of the present disclosure. The tracking reference signal resource configuration 400-c may implement or may be implemented by aspects of the wireless communications systems 100 and 200 as described with reference to FIGS. 1 and 2. respectively. The tracking reference signal resource configuration 400-c may implement or may be implemented by aspects of the tracking reference signal resource configuration 300-a through 300-c as described with reference to FIGS. 3A through 3C. respectively. The tracking reference signal resource configuration 400-c may be based on a configuration by a base station 105, and implemented by a UE 115, and may promote higher reliability and lower latency channel estimation (e.g., a delay spread, an average delay, a Doppler shift and Doppler spread) in a wireless communications system. The tracking reference signal resource configuration 400-*c* may also be based on a configuration by the base station 105, and implemented by the UE 115 to decrease power consumption by the UE 115, if performing channel estimation operations, among other benefits.

The tracking reference signal resource configuration 400-*c* may configure time resources (for example, symbols, minislots, slots) as well as frequency resources (for example, carriers, subcarriers). A base station 105 may allocate at least one subcarrier (e.g., $SC_0$) and at least one symbol in a slot 405 for tracking reference signals. A slot may span fourteen symbols in a time domain (e.g., $S_0$ through $S_{13}$). In the example of FIG. 4C, a base station 105 may allocate a set of symbols for tracking reference signals to improve tracking reference signal coverage for a UE 115. The set may include a combination (e.g., a union) of at least two subset of symbols for tracking reference signals. Each subset may include at least two symbols for tracking reference signals. These symbols may be referred to as tracking reference signal symbols 410.

For example, a base station 105 may allocate a fifth symbol (e.g., $S_4$) and a ninth symbol (e.g., $S_9$) associated with a first subset of symbols for tracking reference signals (e.g., as shown in FIG. 3B), as well as a sixth symbol (e.g., $S_5$) and a tenth symbol (e.g., $S_9$) associated with a second subset of symbols for tracking reference signals (e.g., as shown in FIG. 3C). A UE 115 may determine tracking reference signal symbol locations in the slot 405 based at least in part on symbol indices included in the tracking reference signal resource configuration 400-*c*. For example, a UE 115 may receive the tracking reference signal resource configuration 400-*c*, as part of a semi-static message (e.g., an RRC message) or a dynamic message (e.g., a DCI message, a MAC-CE message, etc.), and determine one or more symbol indices related to tracking reference signal symbol locations in the slot 405 based at least in part on an indication in the semi-static message or the dynamic message. The UE 115 may thereby monitor the fifth symbol (e.g., $S_4$), the ninth symbol (e.g., $S_8$), the sixth symbol (e.g., $S_5$) and the tenth symbol (e.g., $S_9$), in the slot 405, for measuring tracking reference signals.

A UE 115 may thus have an increased number of symbols allocated for tracking reference signals, and thereby improve tracking reference signal coverage for the UE 115. As described with reference to FIG. 2, in some examples, a UE 115 may revert back to a default tracking reference signal configuration based at least in part on receiving an indication (e.g., via dynamic signaling) from a base station 105, or an expiration of a timer (e.g., a preconfigured timer), or a combination thereof. For example, a UE 115 may return to measuring tracking reference signals based at least in part on a tracking reference signal configuration (e.g., as shown in FIGS. 3A through 3C) having a decreased number of tracking reference signal symbols compared to the tracking reference signal resource configuration 400-*c*.

Although FIG. 4C illustrates a union between, for example, at least two tracking reference signal configurations (e.g., the tracking reference signal resource configuration 300-*b* as shown in FIG. 3B and the tracking reference signal resource configuration 300-*c* shown in FIG. 3C), other examples are possible and supported by the present disclosure. Additionally, while FIG. 4C illustrates a union between at least two tracking reference signal configurations (e.g., the tracking reference signal resource configuration 300-*b* as shown in FIG. 3B and the tracking reference signal resource configuration 300-*c* shown in FIG. 3C), other examples are possible and supported by the present disclosure in which more than two tracking reference signal configurations are combined to provide enhancements to tracking reference signal coverage for a UE 115.

Figure 5:
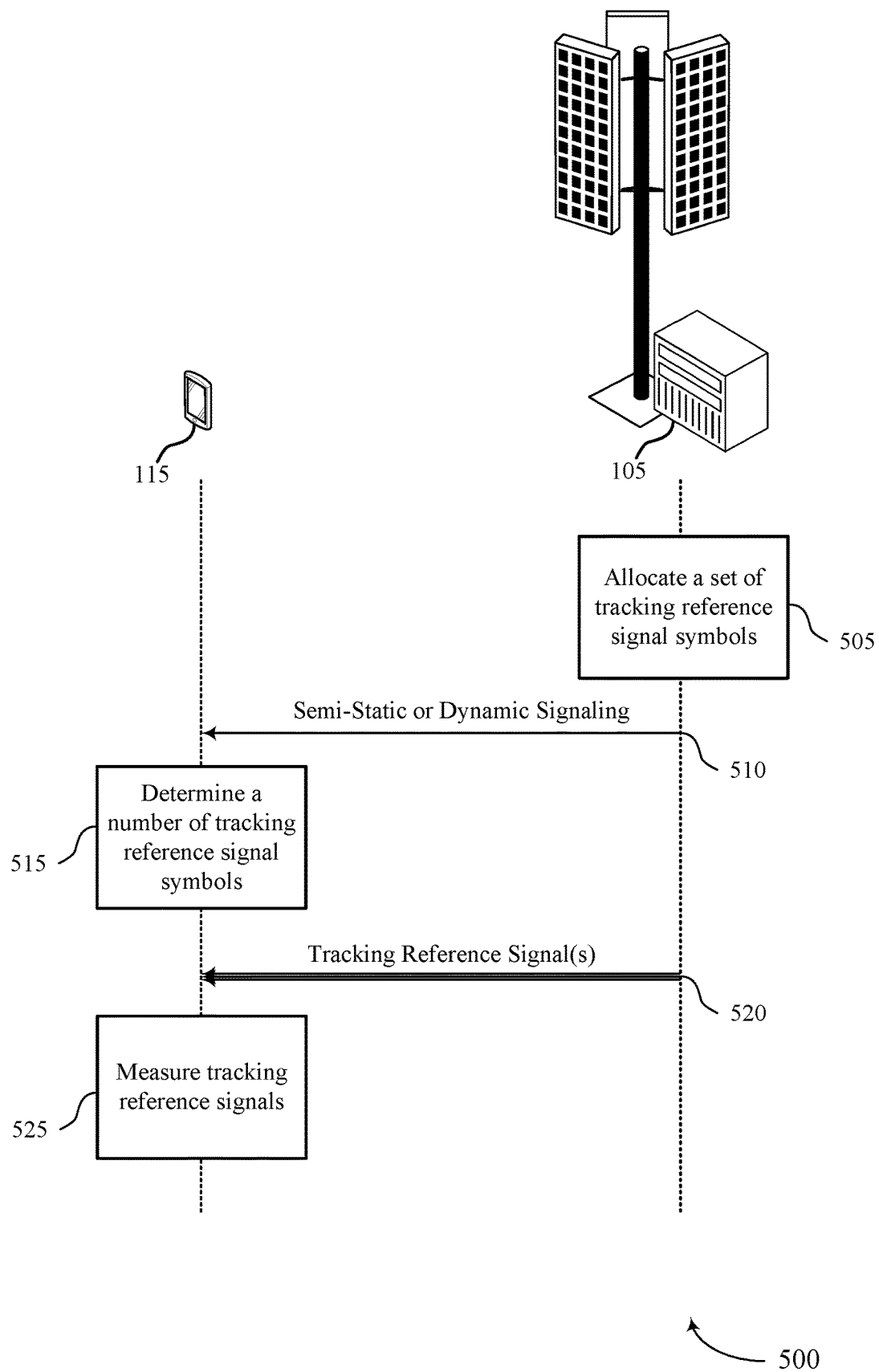
FIG. 5 illustrates an example of a process flow that supports techniques for adapting a number of tracking reference signal symbols in accordance with various aspects of the present disclosure.

FIG. 5 illustrates an example of a process flow 500 that supports techniques for adapting a number of tracking reference signal symbols in accordance with various aspects of the present disclosure. The process flow 500 may implement aspects of the wireless communications system 100 and the wireless communications system 200 described with reference to FIGS. 1 and 2, respectively. The process flow 500 may be based on a configuration by a base station 105 and implemented by a UE 115 to promote power saving for the UE 115 by enhanced coverage for tracking reference signals. The process flow 500 may also be based on a configuration by the base station 105 and implemented by the UE 115 to promote high reliability and low latency channel operations (e.g., a delay spread, an average delay, a Doppler shift and Doppler spread), among other benefits.

In the following description of the process flow 500, the operations between the base station 105 and the UE 115 may be transmitted in a different order than the example order shown, or the operations performed by the base station 105 and the UE 115 may be performed in different orders or at different times. Some operations may also be omitted from the process flow 500, and other operations may be added to the process flow 500. The base station 105 and the UE 115 may be examples of a base station 105 and a UE 115 as described with reference to FIGS. 1 and 2, respectively.

At 505, the base station 105 may allocate a set of tracking reference signal symbols, for example, including one or more subset of tracking reference signal symbols, as described with reference to FIGS. 3A through 3C and 4A through 4C. The set of tracking reference signal symbols may include a union of at least two subset of tracking reference signal symbols. In some examples, a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10. In some other examples, a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

At 510, the base station 105 may transmit, via semi-static signaling or dynamic signaling, an indication of the set of tracking reference signal symbols including the one or more subset of tracking reference signal symbols. In some examples, the base station 105 may transmit a DCI message including the indication of the set of tracking reference signal symbols. In some other examples, the base station 105 may transmit a MAC-CE message including the indication of the set of tracking reference signal symbols. In other examples, the base station 105 may transmit an RRC message including the indication of the set of tracking reference signal symbols. At 515, the UE 115 may determine a number of tracking reference signal symbols. In some examples, the UE 115 may adjust the number of tracking reference signal symbols to or from a default number of tracking reference signal symbols based on the received indication. At 520, the base station 105 may transmit one or more tracking reference signals. At 525, the UE 115 may measure the tracking reference signals, for example, on the determined number of tracking reference signal symbols.

Figure 6:
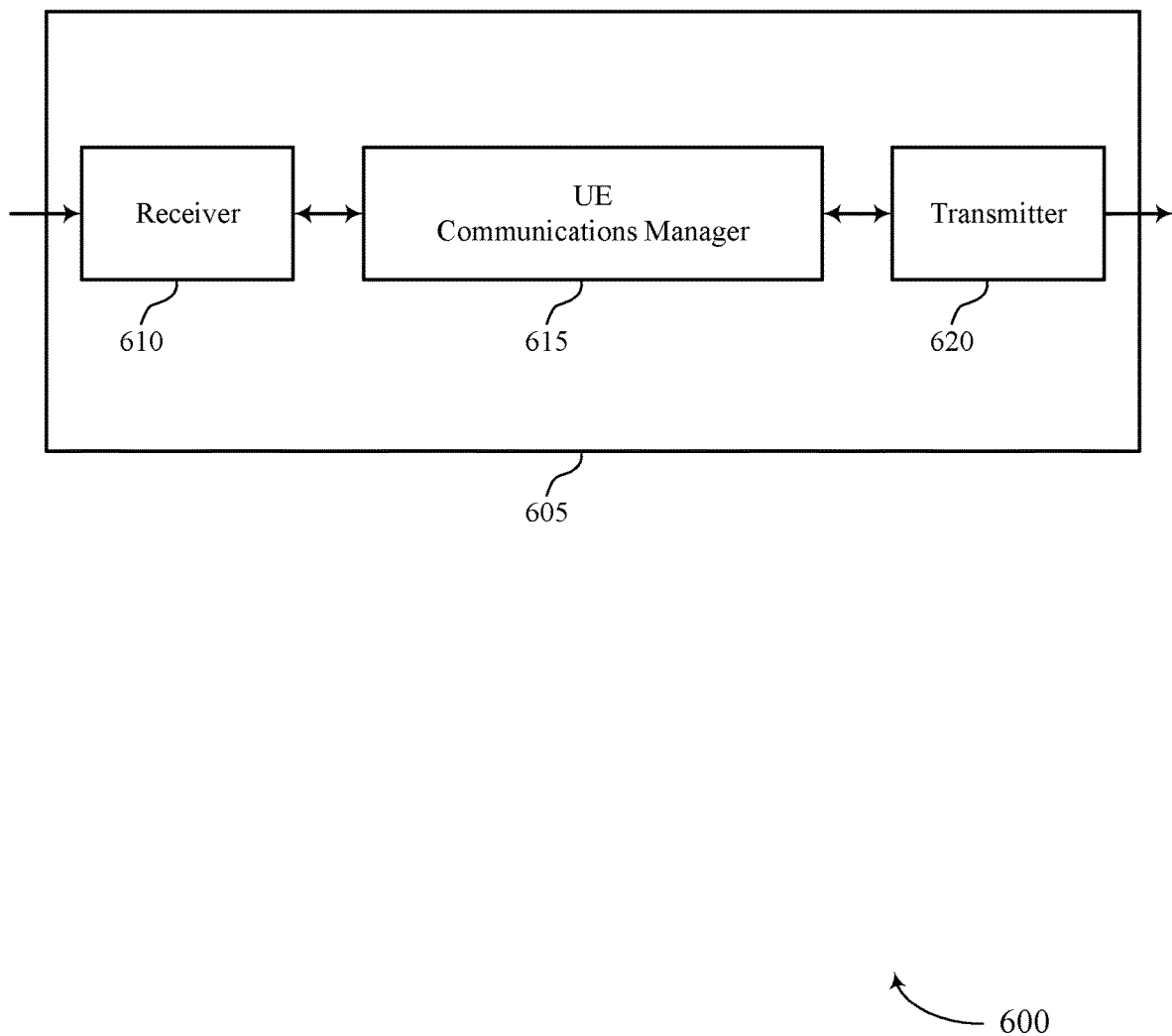
FIGS. 6 and 7 show block diagrams of devices that support techniques for adapting a number of tracking reference signal symbols in accordance with various aspects of the present disclosure.

FIG. 6 shows a block diagram 600 of a device 605 that supports techniques for adapting a number of tracking reference signal symbols in accordance with various aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for adapting a number of tracking reference signal symbols, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive an indication of a set of tracking reference signal symbols, the set of tracking reference signal symbols includes one or more subset of tracking reference signal symbols, each of the one or more subset of tracking reference signal symbols includes at least two or more tracking reference signal symbols, determine a number of tracking reference signal symbols based on the received indication, and measure a tracking reference signal based on the adjusted number of tracking reference signal symbols. The UE communications manager 615 may be an example of aspects of the UE communications manager 910 described herein.

At least one implementation may enable the UE communications manager 615 to improve coverage for tracking reference signals for the device 605 by adapting a number of tracking reference signal symbols. Based on implementing the adaptation, one or more processors of the device 605 (for example, processor(s) controlling or incorporated with the UE communications manager 615) may promote improvements to power consumption, spectral efficiency, higher data rates and, in some examples, may promote enhanced efficiency for high reliability and low latency channel operations, among other benefits by supporting enhanced coverage for tracking reference signals.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
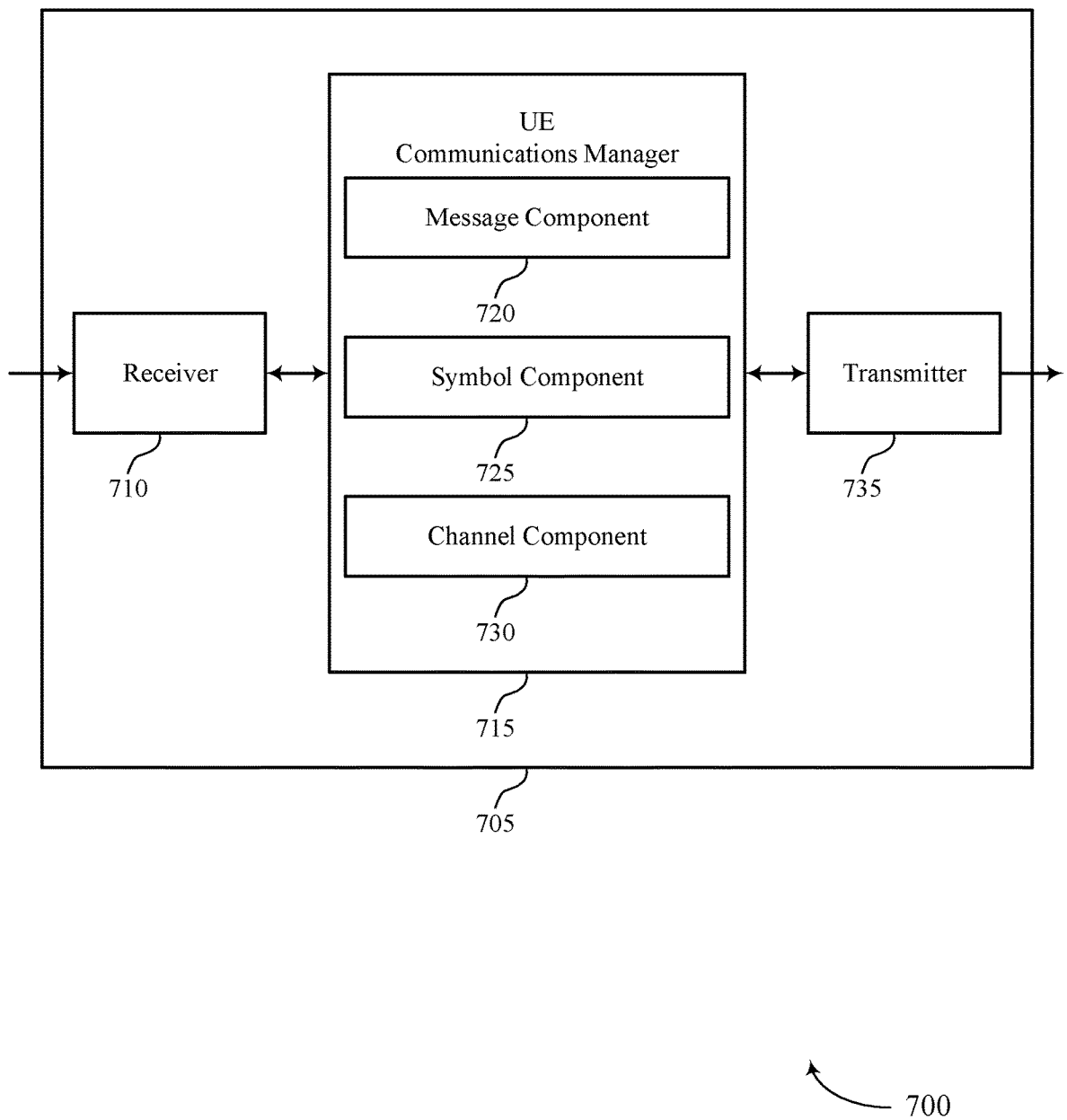

FIG. 7 shows a block diagram 700 of a device 705 that supports techniques for adapting a number of tracking reference signal symbols in accordance with various aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for adapting a number of tracking reference signal symbols, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a message component 720, a symbol component 725, and a channel component 730. The UE communications manager 715 may be an example of aspects of the UE communications manager 910 described herein.

The message component 720 may receive an indication of a set of tracking reference signal symbols, the set of tracking reference signal symbols includes one or more subset of tracking reference signal symbols, each of the one or more subset of tracking reference signal symbols includes at least two or more tracking reference signal symbols. The symbol component 725 may determine a number of tracking reference signal symbols based on the received indication. The channel component 730 may measure a tracking reference signal based on the adjusted number of tracking reference signal symbols.

The transmitter 735 may transmit signals generated by other components of the device 705. In some examples, the transmitter 735 may be collocated with a receiver 710 in a transceiver component. For example, the transmitter 735 may be an example of aspects of the transceiver 920 described with reference to FIG. 9. The transmitter 735 may utilize a single antenna or a set of antennas.

Figure 8:
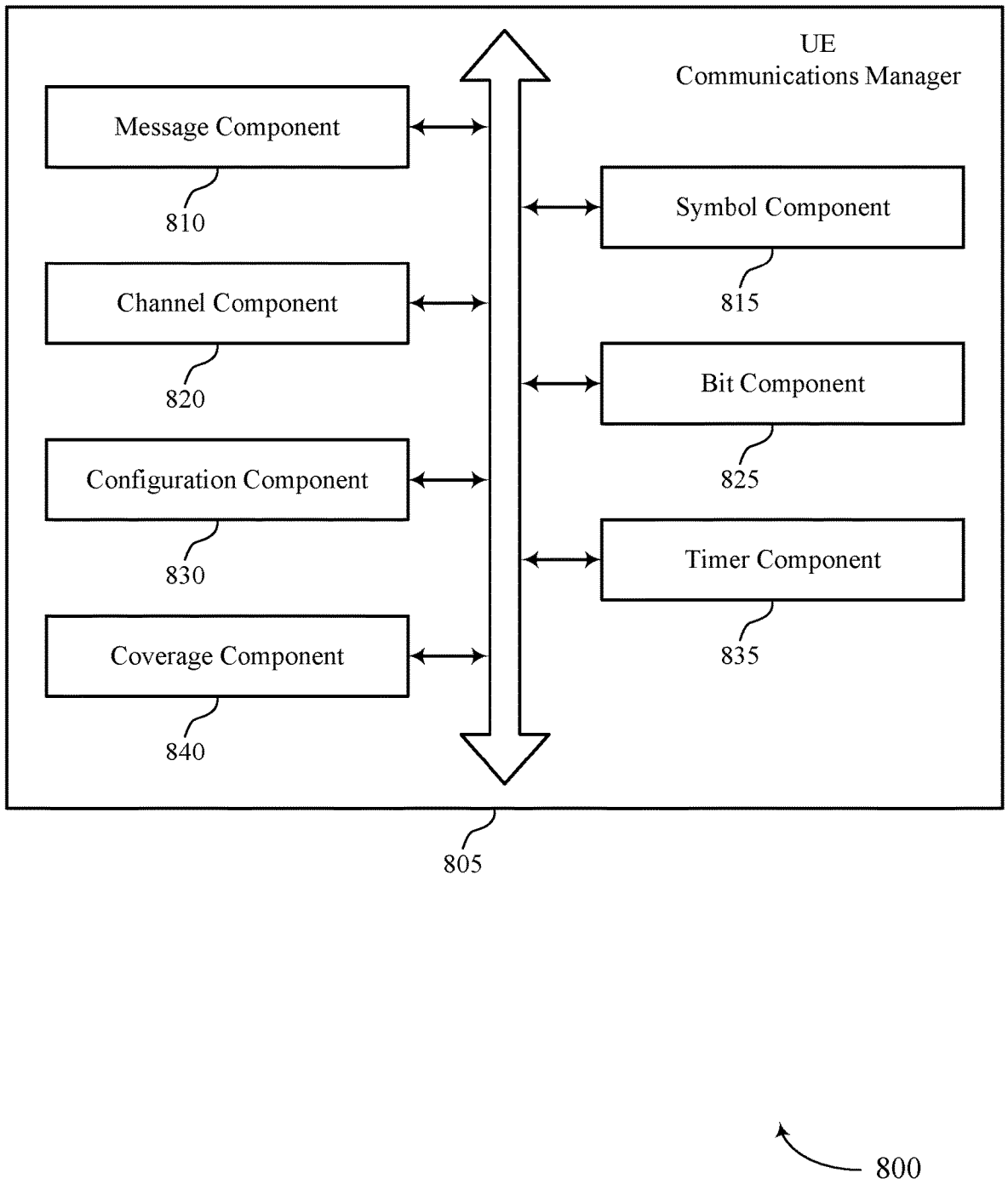
FIG. 8 shows a block diagram of a user equipment (UE) communications manager that supports techniques for adapting a number of tracking reference signal symbols in accordance with various aspects of the present disclosure.

FIG. 8 shows a block diagram 800 of a UE communications manager 805 that supports techniques for adapting a number of tracking reference signal symbols in accordance with various aspects of the present disclosure. The UE communications manager 805 may be an example of aspects of a UE communications manager 615, a UE communications manager 715, or a UE communications manager 910 described herein. The UE communications manager 805 may include a message component 810, a symbol component 815, a channel component 820, a bit component 825, a configuration component 830, a timer component 835, and a coverage component 840. Each of these components may communicate, directly or indirectly, with one another (e.g., via one or more buses).

The message component 810 may receive an indication of a set of tracking reference signal symbols, the set of tracking reference signal symbols includes one or more subset of tracking reference signal symbols, each of the one or more subset of tracking reference signal symbols includes at least two or more tracking reference signal symbols. In some examples, the message component 810 may receive a DCI message including the indication of the set of tracking reference signal symbol locations including the one or more subset of tracking reference signal symbol locations, where determining a number of tracking reference signal symbol locations is based on the received DCI message. In some cases, the DCI message includes a UE-specific DCI message or a GC-DCI message associated with a group of UEs.

The message component 810 may receive a MAC-CE message including the indication of the set of tracking reference signal symbol locations including the one or more subset of tracking reference signal symbol locations, where determining the number of tracking reference signal symbol locations is based on the received MAC-CE message. In some examples, the message component 810 may receive a RRC message including a default tracking reference signal configuration of a default set of tracking reference signal symbols, the default set of tracking reference signal symbols including the one or more subset of tracking reference signal symbols, the one or more subset of tracking reference signal symbols each including at least two or more tracking reference signal symbols, where determining the number of tracking reference signal symbols is based on the received indication and the default tracking reference signal configuration.

The symbol component 815 may determine a number of tracking reference signal symbols based on the received indication. In some examples, the symbol component 815 may determine a symbol index associated with each tracking reference signal symbol in the adjusted number of tracking reference signal symbols within a slot having a symbol index ranging from 0 to 14. In some examples, the symbol component 815 may adjust the number of tracking reference signal symbols to a default number of tracking reference signal symbols based on receiving a second indication. The symbol component 815 may determine a first number of tracking reference signal symbols based on a default tracking reference signal configuration. In some examples, the symbol component 815 may determine a second number of tracking reference signal symbols based on the received indication, the first number of tracking reference signal symbols is different from the second number of tracking reference signal symbols. In some cases, the second number of tracking reference signal symbols is greater than the first number of tracking reference signal symbols.

The set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof. In some cases, the set of tracking reference signal symbols includes a union of at least two subset of tracking reference signal symbols. In some cases, a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10. In some other cases, a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

The channel component 820 may measure a tracking reference signal based on the adjusted number of tracking reference signal symbols. In some examples, the channel component 820 may measure the tracking reference signal based on the second number of tracking reference signal symbols. The bit component 825 may determine a bit value associated with the received indication. In some examples, the bit component 825 may select the one or more subset of tracking reference signal symbols based on the determined bit value associated with the received indication, the one or more subset of tracking reference signal symbols each including at least two or more tracking reference signal symbols, where determining the number of tracking reference signal symbols is based on the one or more selected subset of tracking reference signal symbols.

The configuration component 830 may switch from a primary tracking reference signal configuration to a secondary tracking reference signal configuration based on the indication, where measuring the tracking reference signal is based on switching from the primary tracking reference signal configuration to the secondary tracking reference signal configuration. In some examples, the configuration component 830 may determine one or more tracking reference signal parameters based on switching from the primary tracking reference signal configuration to the secondary tracking reference signal configuration, the one or more tracking reference signal parameters including a length of a tracking reference signal burst, a periodicity of the tracking reference signal burst, a number of symbols for a tracking reference signal transmission within a slot, a bandwidth part for the tracking reference signal transmission, a subcarrier spacing associated with the tracking reference signal transmission, or a symbol spacing associated with the tracking reference signal transmission, or any combination thereof, where measuring the tracking reference signal is based on the one or more determined tracking reference signal parameters.

The timer component 835 may enable a timer based on determining the number of tracking reference signal symbols. In some examples, the timer component 835 may adjust the number of tracking reference signal symbols to a default number of tracking reference signal symbols according to a default tracking reference signal configuration based on the timer lapsing. The coverage component 840 may determine a tracking reference signal coverage condition. In some examples, the coverage component 840 may transmit a request message to increase the number of tracking reference signal symbols based on the determined tracking reference signal coverage condition. In some examples, the coverage component 840 may receive a response message including the indication based on the transmitted request message to increase the number of tracking reference signal symbols, where determining the number of tracking reference signal symbols is based on the received response message including the indication. In some examples, the coverage component 840 may transmit a request message to decrease the number of tracking reference signal symbols based on the determined tracking reference signal coverage condition. In some examples, the coverage component 840 may receive a response message including the indication based on the transmitted request message to decrease the number of tracking reference signal symbols, where determining the number of tracking reference signal symbols is based on the received response message including the indication.

Figure 9:
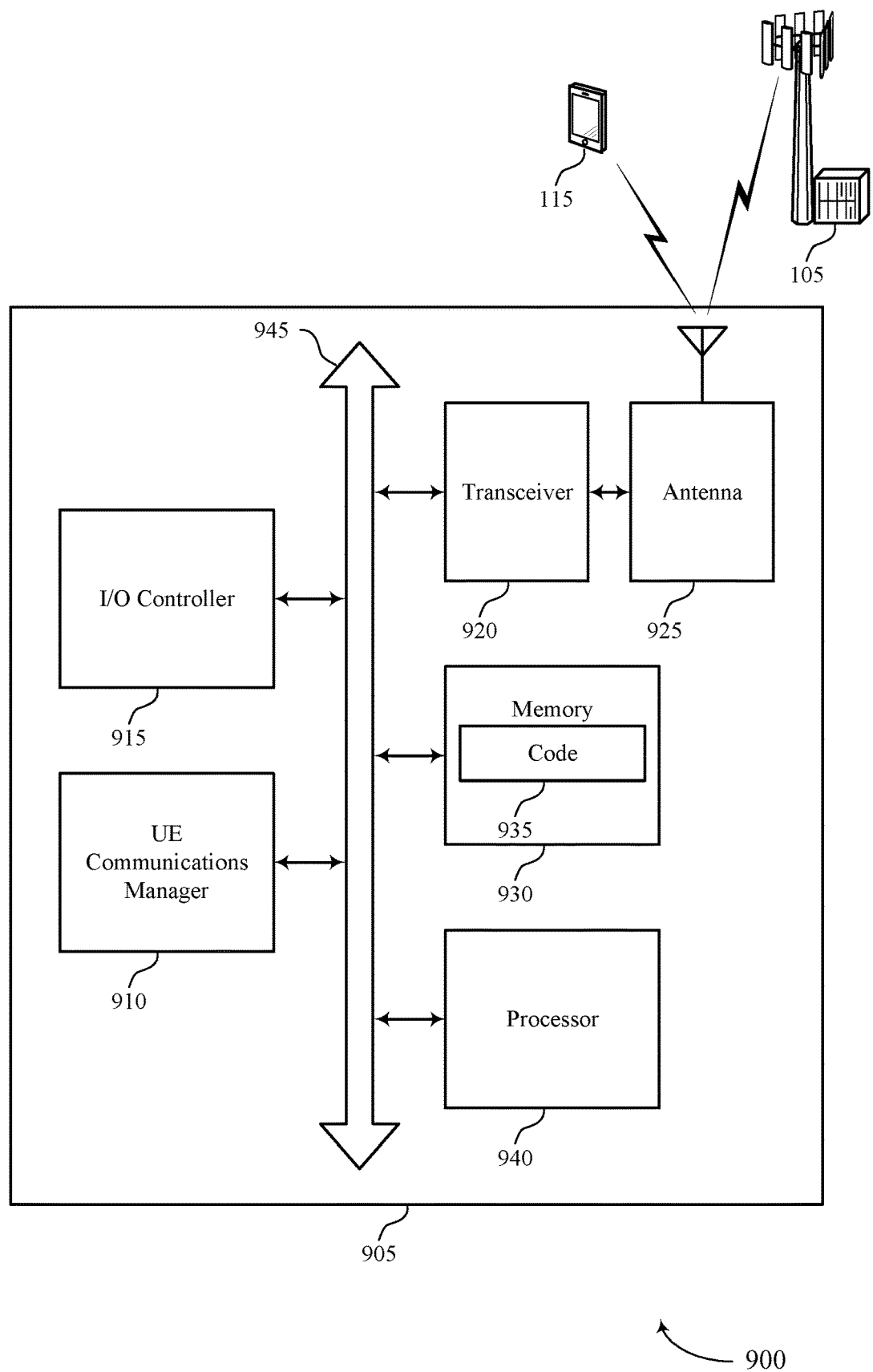
FIG. 9 shows a diagram of a system including a device that supports techniques for adapting a number of tracking reference signal symbols in accordance with various aspects of the present disclosure.

FIG. 9 shows a diagram of a system 900 including a device 905 that supports techniques for adapting a number of tracking reference signal symbols in accordance with various aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive an indication of a set of tracking reference signal symbols, the set of tracking reference signal symbols includes one or more subset of tracking reference signal symbols, each of the one or more subset of tracking reference signal symbols includes at least two or more tracking reference signal symbols, determine a number of tracking reference signal symbols based on the received indication, and measure a tracking reference signal based on the adjusted number of tracking reference signal symbols.

The UE communications manager 910 may be implemented as an integrated circuit or chipset for the device 905, and the transceiver 920 may be implemented as analog components (for example, amplifiers, filters, antennas) coupled with the device 905 modem to enable wireless transmission and reception The actions performed by the UE communications manager 910 as described herein may be implemented to realize one or more potential advantages. At least one implementation may enable the UE communications manager 910 to improve coverage for tracking reference signals for the device 905 by adapting a number of tracking reference signal symbols. Based on implementing the adaptation, one or more processors of the device 905 (for example, processor(s) controlling or incorporated with the UE communications manager 910) may promote improvements to power consumption, spectral efficiency, higher data rates and, in some examples, may promote enhanced efficiency for high reliability and low latency channel operations, among other benefits by supporting enhanced coverage for tracking reference signals.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor 940 to perform various functions described herein. In some cases, the memory 930 may contain, among other things, a basic input/output system (BIOS) which may control basic hardware or software operation such as the interaction with peripheral components or devices. The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for adapting a number of tracking reference signal symbols).

Figure 10:
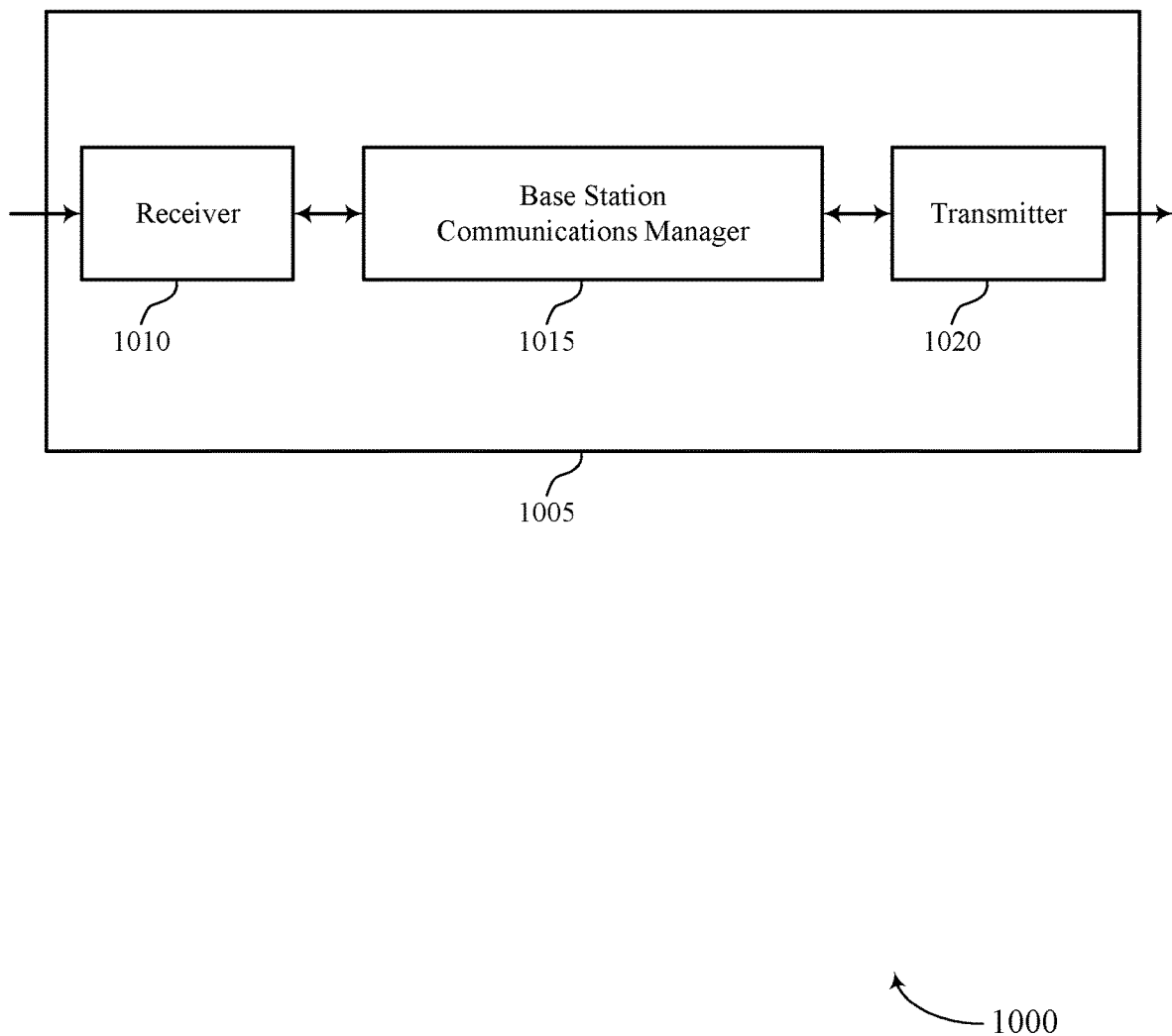
FIGS. 10 and 11 show block diagrams of devices that support techniques for adapting a number of tracking reference signal symbols in accordance with various aspects of the present disclosure.

FIG. 10 shows a block diagram 1000 of a device 1005 that supports techniques for adapting a number of tracking reference signal symbols in accordance with various aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for adapting a number of tracking reference signal symbols, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may allocate a set of tracking reference signal symbols including one or more subset of tracking reference signal symbols and transmit an indication of the set of tracking reference signal symbols including the one or more subset of tracking reference signal symbols, the one or more subset of tracking reference signal symbols each including at least two or more tracking reference signal symbols. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
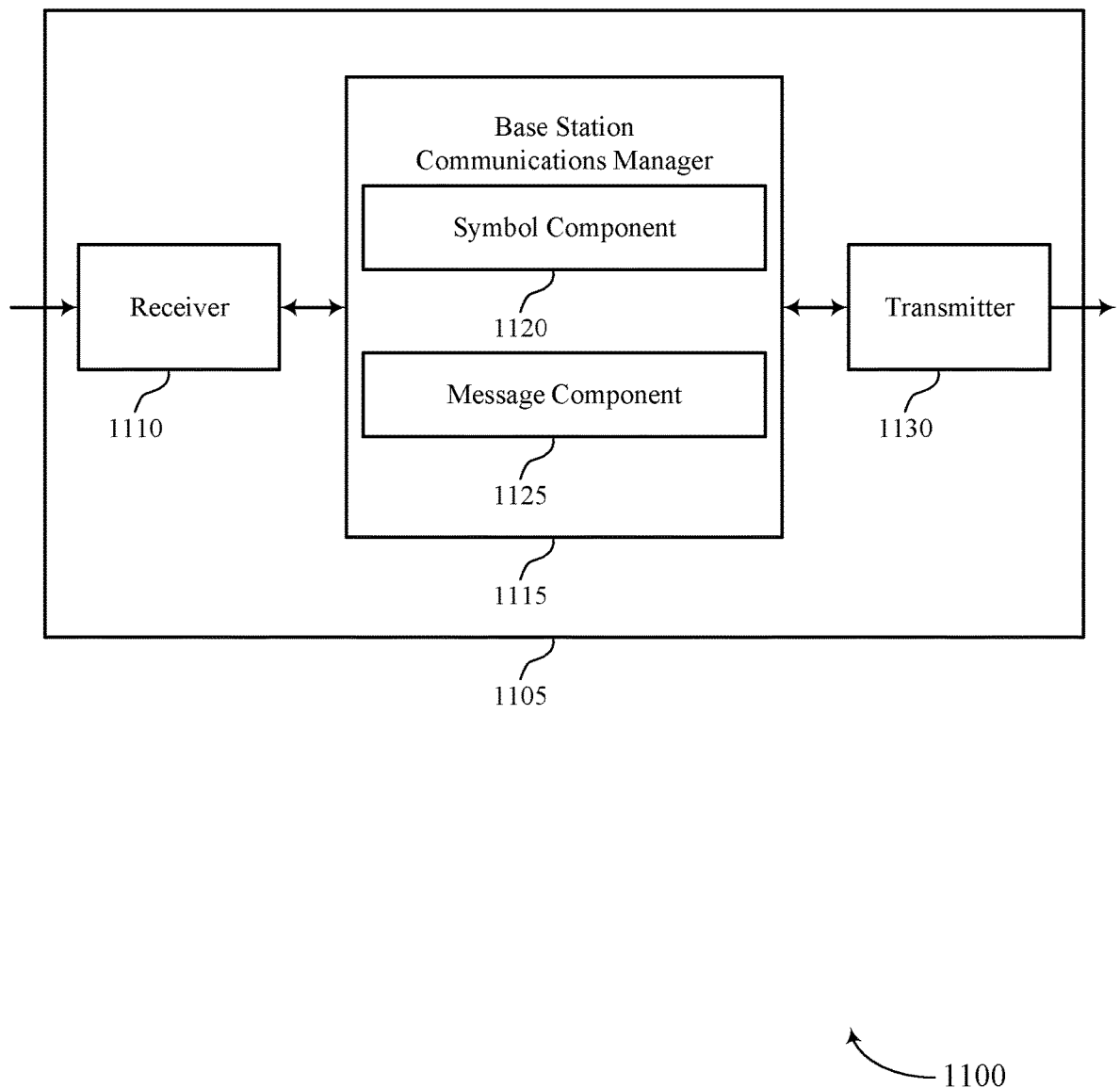

FIG. 11 shows a block diagram 1100 of a device 1105 that supports techniques for adapting a number of tracking reference signal symbols in accordance with various aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for adapting a number of tracking reference signal symbols, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a symbol component 1120 and a message component 1125. The base station communications manager 1115 may be an example of aspects of the base station communications manager 1310 described herein.

The symbol component 1120 may allocate a set of tracking reference signal symbols including one or more subset of tracking reference signal symbols. The message component 1125 may transmit an indication of the set of tracking reference signal symbols including the one or more subset of tracking reference signal symbols, the one or more subset of tracking reference signal symbols each including at least two or more tracking reference signal symbols.

The transmitter 1130 may transmit signals generated by other components of the device 1105. In some examples, the transmitter 1130 may be collocated with a receiver 1110 in a transceiver component. For example, the transmitter 1130 may be an example of aspects of the transceiver 1320 described with reference to FIG. 13. The transmitter 1130 may utilize a single antenna or a set of antennas.

Figure 12:
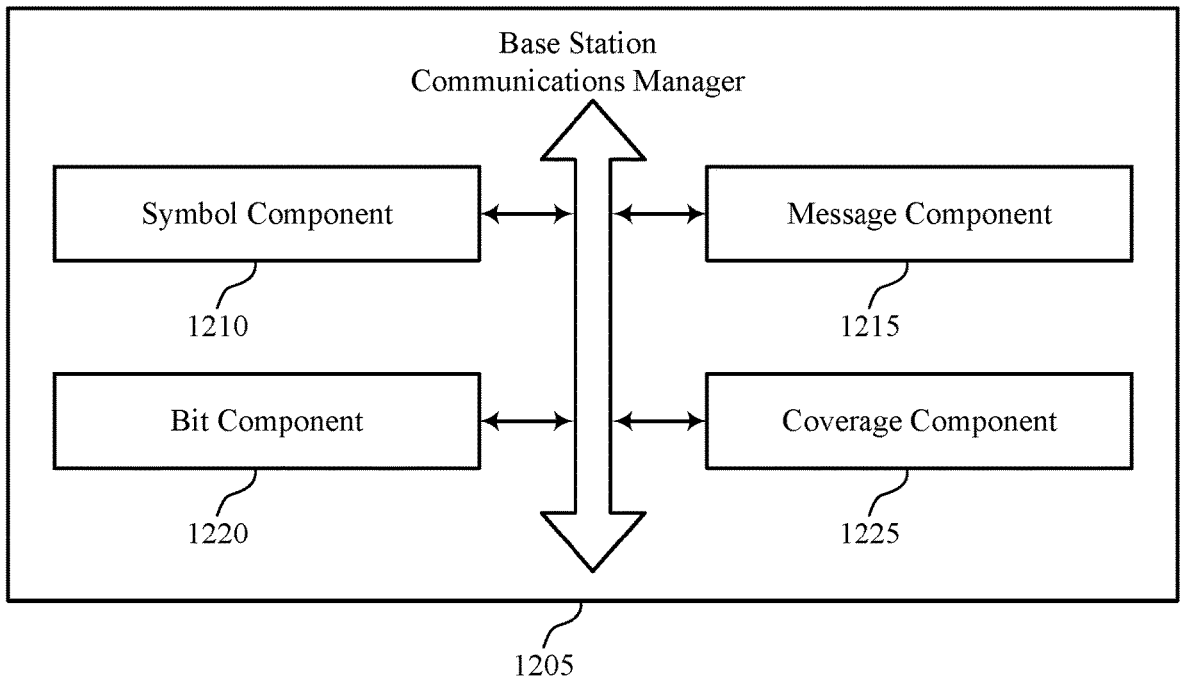
FIG. 12 shows a block diagram of a base station communications manager that supports techniques for adapting a number of tracking reference signal symbols in accordance with various aspects of the present disclosure.

FIG. 12 shows a block diagram 1200 of a base station communications manager 1205 that supports techniques for adapting a number of tracking reference signal symbols in accordance with various aspects of the present disclosure. The base station communications manager 1205 may be an example of aspects of a base station communications manager 1015, a base station communications manager 1115, or a base station communications manager 1310 described herein. The base station communications manager 1205 may include a symbol component 1210, a message component 1215, a bit component 1220, and a coverage component 1225. Each of these components may communicate, directly or indirectly, with one another (e.g., via one or more buses).

The symbol component 1210 may allocate a set of tracking reference signal symbols including one or more subset of tracking reference signal symbols. The set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

The set of tracking reference signal symbols includes a union of at least two subset of tracking reference signal symbols. In some cases, a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10. In some cases, a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

The message component 1215 may transmit an indication of the set of tracking reference signal symbols including the one or more subset of tracking reference signal symbols, the one or more subset of tracking reference signal symbols each including at least two or more tracking reference signal symbols. In some examples, the message component 1215 may transmit a DCI message including the indication of the set of tracking reference signal symbol locations including the one or more subset of tracking reference signal symbol locations. In some examples, the message component 1215 may transmit a MAC-CE message including the indication of the set of tracking reference signal symbol locations including the one or more subset of tracking reference signal symbol locations. In some examples, the message component 1215 may transmit an RRC message including a default tracking reference signal configuration of a default set of tracking reference signal symbols, the default set of tracking reference signal symbols including the one or more subset of tracking reference signal symbols. In some cases, the DCI message includes a UE-specific DCI message or a GC-DCI message associated with a group of UEs.

The bit component 1220 may assign a bit value to the indication, the bit value corresponding to the one or more subset of tracking reference signal symbols. The coverage component 1225 may receive a request message to increase a number of tracking reference signal symbols based on a tracking reference signal coverage condition, where allocating the set of tracking reference signal symbols is based on the received request message. In some examples, the coverage component 1225 may transmit a response message including the indication based on the received request message to increase the number of tracking reference signal symbols. In some examples, the coverage component 1225 may receive a request message to decrease a number of tracking reference signal symbols based on a tracking reference signal coverage condition, where allocating the set of tracking reference signal symbols is based on the received request message. In some examples, the coverage component 1225 may transmit a response message including the indication based on the received request message to decrease the number of tracking reference signal symbols.

Figure 13:
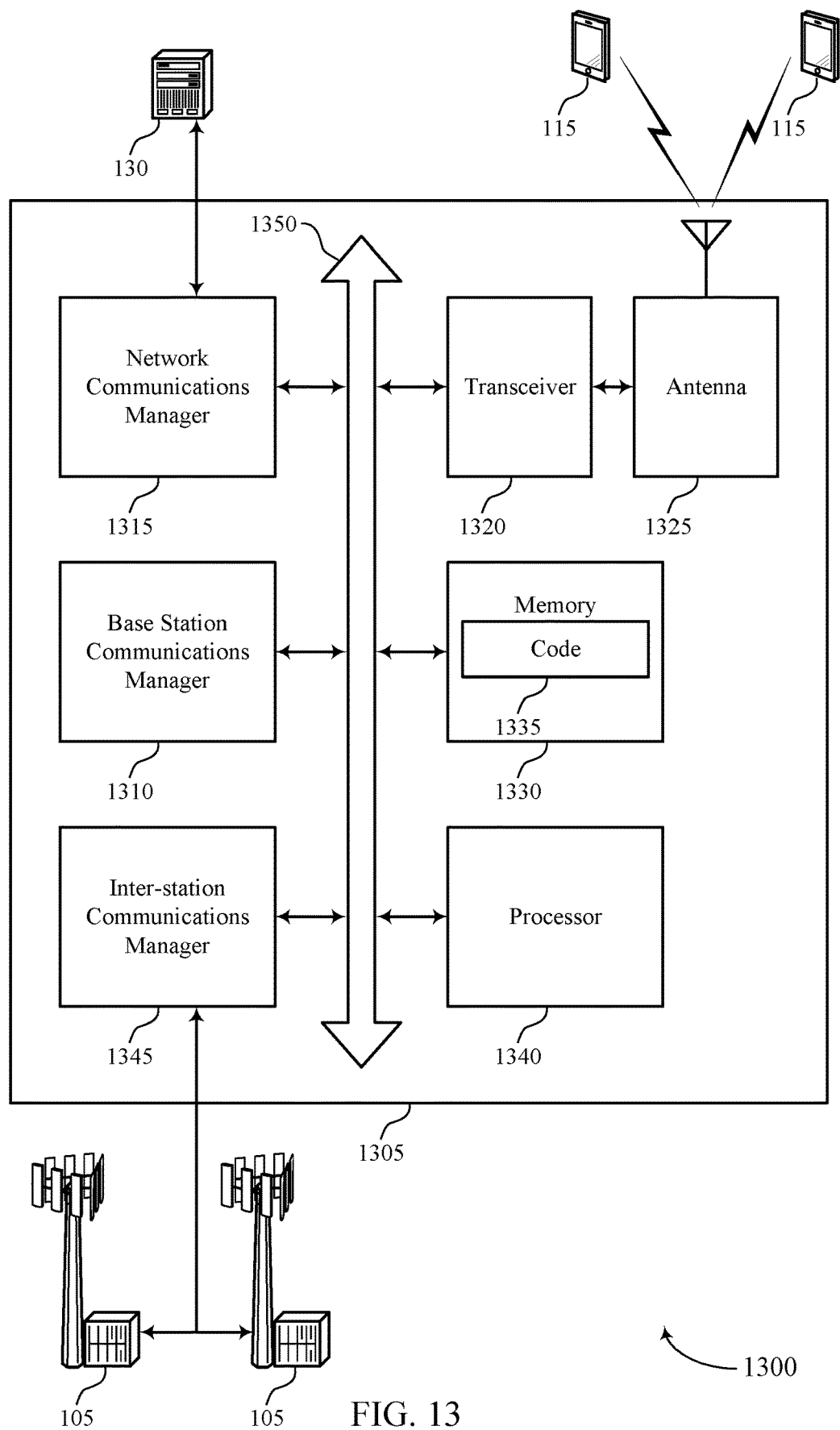
FIG. 13 shows a diagram of a system including a device that supports techniques for adapting a number of tracking reference signal symbols in accordance with various aspects of the present disclosure.

FIG. 13 shows a diagram of a system 1300 including a device 1305 that supports techniques for adapting a number of tracking reference signal symbols in accordance with various aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may allocate a set of tracking reference signal symbols including one or more subset of tracking reference signal symbols and transmit an indication of the set of tracking reference signal symbols including the one or more subset of tracking reference signal symbols, the one or more subset of tracking reference signal symbols each including at least two or more tracking reference signal symbols.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices. The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for adapting a number of tracking reference signal symbols).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
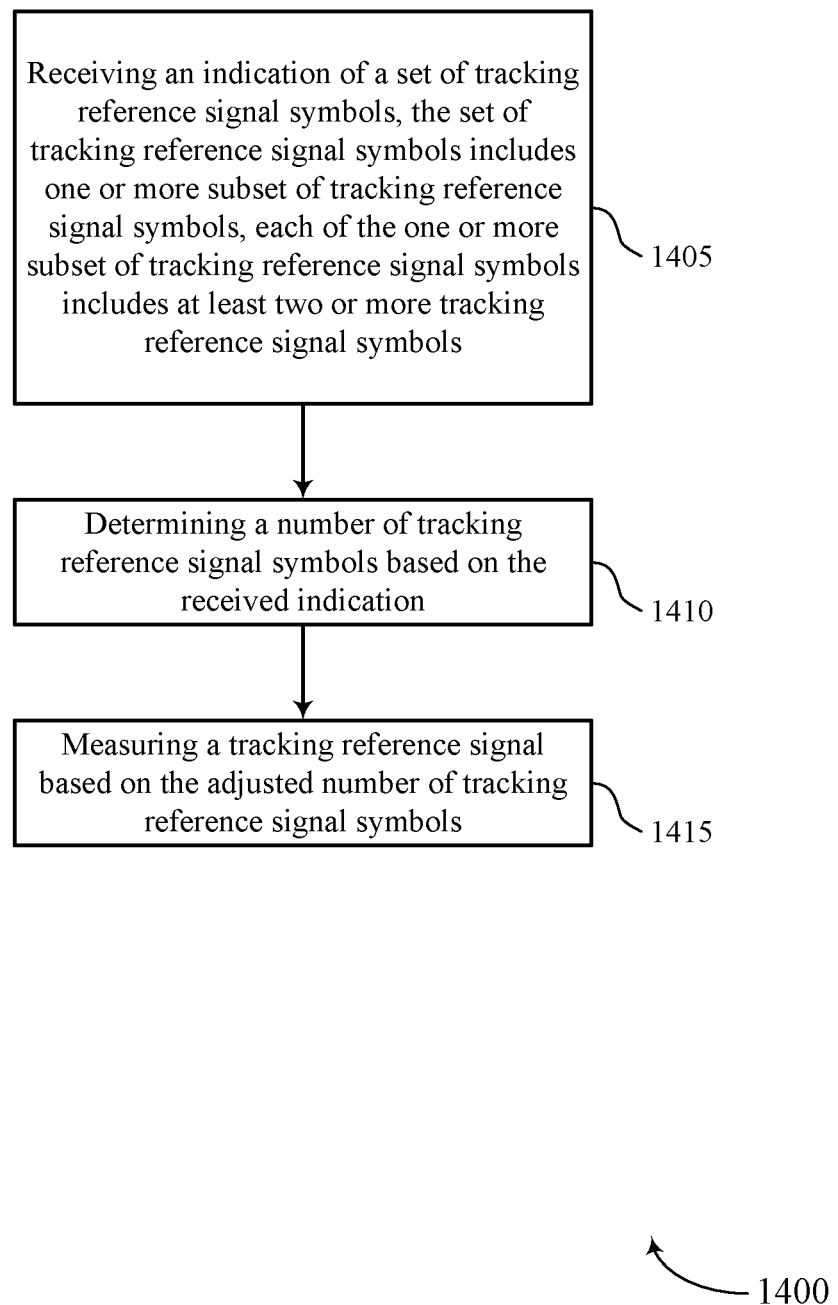
FIGS. 14 through 17 show flowcharts illustrating methods that support techniques for adapting a number of tracking reference signal symbols in accordance with various aspects of the present disclosure.

FIG. 14 shows a flowchart illustrating a method 1400 that supports techniques for adapting a number of tracking reference signal symbols in accordance with various aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive an indication of a set of tracking reference signal symbols, the set of tracking reference signal symbols includes one or more subset of tracking reference signal symbols, each of the one or more subset of tracking reference signal symbols includes at least two or more tracking reference signal symbols. The operations of 1405 may be performed according to the methods described herein. In some examples, aspects of the operations of 1405 may be performed by a message component as described with reference to FIGS. 6 through 9.

At 1410, the UE may determine a number of tracking reference signal symbols based on the received indication. The operations of 1410 may be performed according to the methods described herein. In some examples, aspects of the operations of 1410 may be performed by a symbol component as described with reference to FIGS. 6 through 9.

At 1415, the UE may measure a tracking reference signal based on the adjusted number of tracking reference signal symbols. The operations of 1415 may be performed according to the methods described herein. In some examples, aspects of the operations of 1415 may be performed by a channel component as described with reference to FIGS. 6 through 9.

Figure 15:
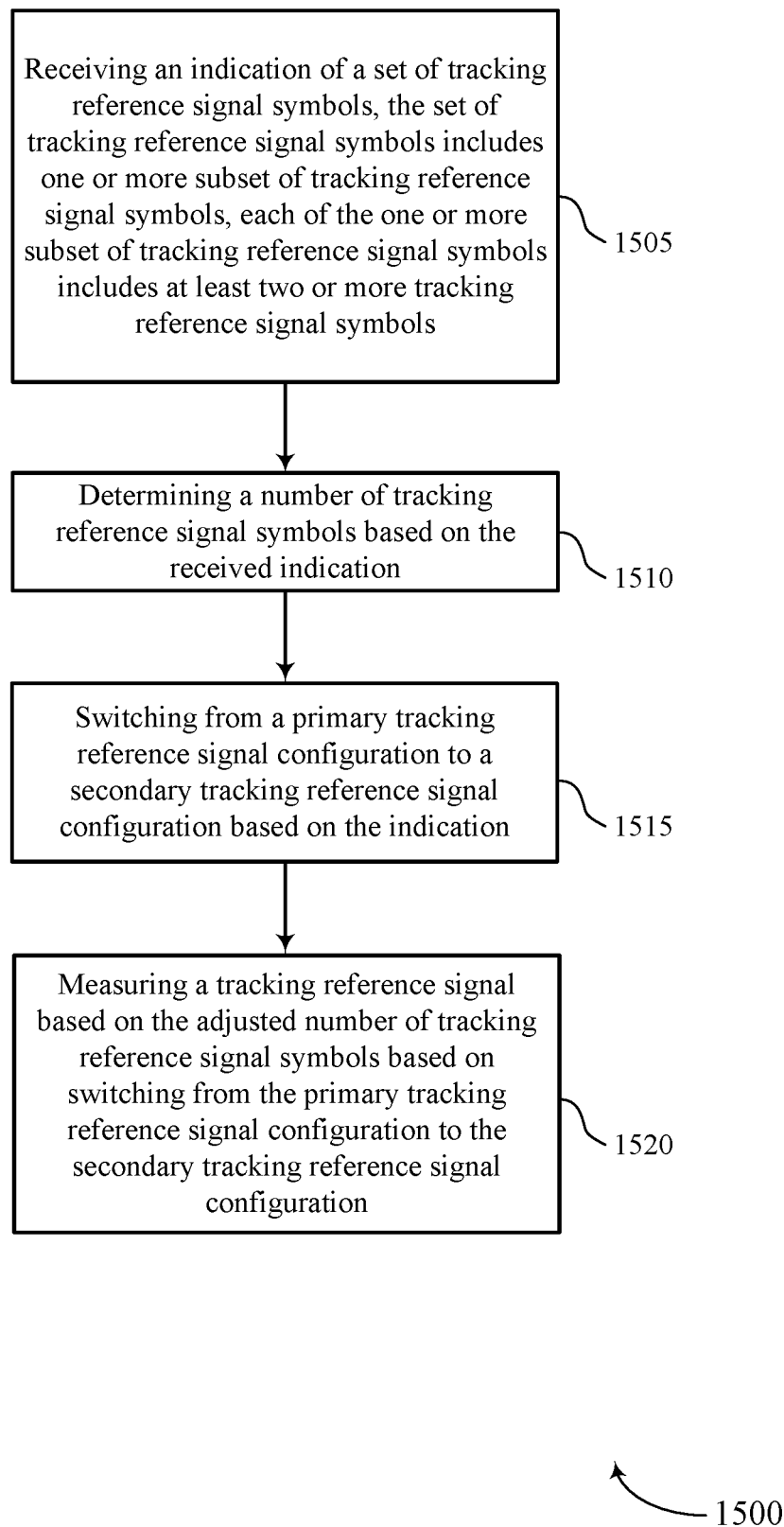

FIG. 15 shows a flowchart illustrating a method 1500 that supports techniques for adapting a number of tracking reference signal symbols in accordance with various aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive an indication of a set of tracking reference signal symbols, the set of tracking reference signal symbols includes one or more subset of tracking reference signal symbols, each of the one or more subset of tracking reference signal symbols includes at least two or more tracking reference signal symbols. The operations of 1505 may be performed according to the methods described herein. In some examples, aspects of the operations of 1505 may be performed by a message component as described with reference to FIGS. 6 through 9.

At 1510, the UE may determine a number of tracking reference signal symbols based on the received indication. The operations of 1510 may be performed according to the methods described herein. In some examples, aspects of the operations of 1510 may be performed by a symbol component as described with reference to FIGS. 6 through 9.

At 1515, the UE may switch from a primary tracking reference signal configuration to a secondary tracking reference signal configuration based on the indication. The operations of 1515 may be performed according to the methods described herein. In some examples, aspects of the operations of 1515 may be performed by a configuration component as described with reference to FIGS. 6 through 9.

At 1520, the UE may measure a tracking reference signal based on the adjusted number of tracking reference signal symbols based on switching from the primary tracking reference signal configuration to the secondary tracking reference signal configuration. The operations of 1520 may be performed according to the methods described herein. In some examples, aspects of the operations of 1520 may be performed by a channel component as described with reference to FIGS. 6 through 9.

Figure 16:
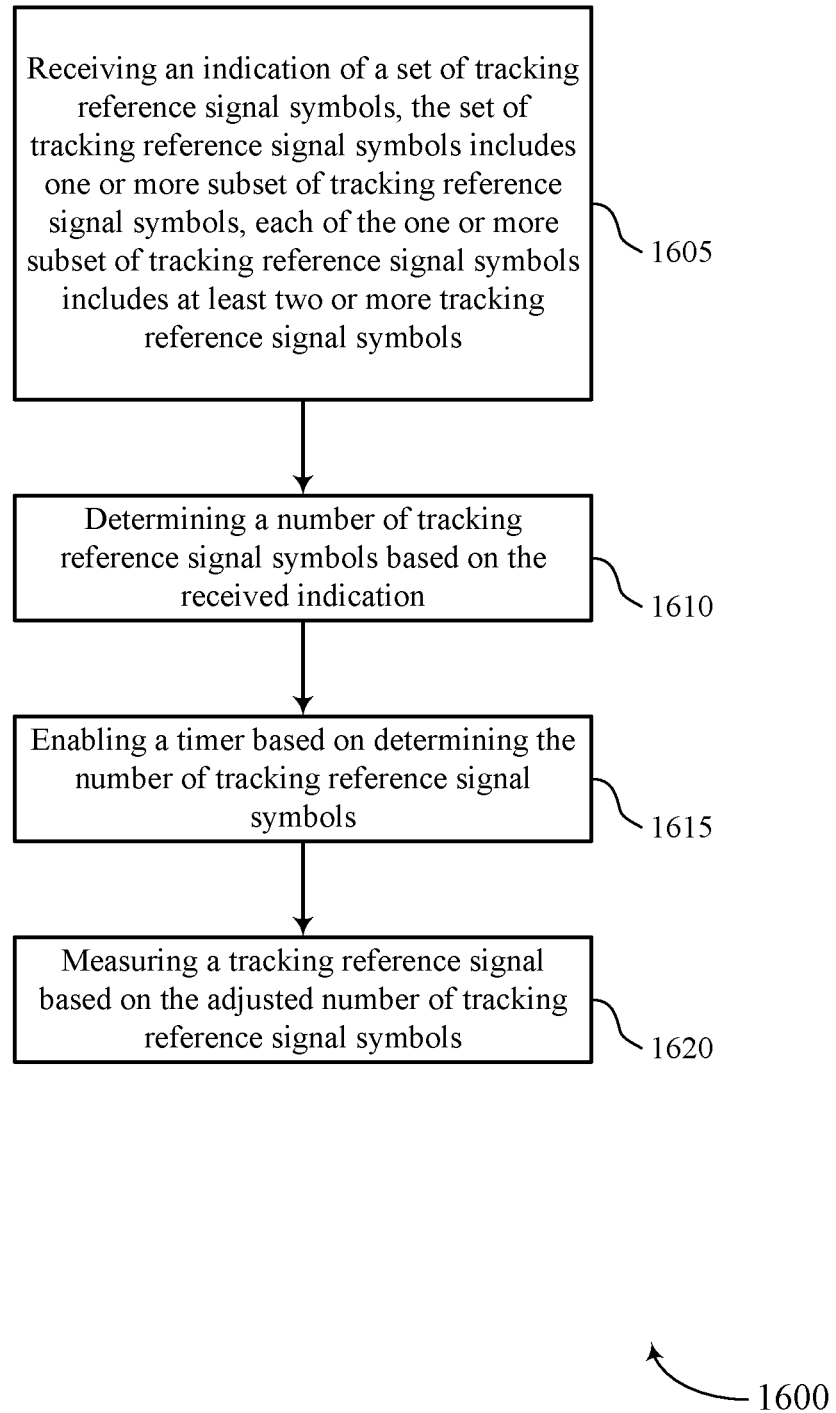

FIG. 16 shows a flowchart illustrating a method 1600 that supports techniques for adapting a number of tracking reference signal symbols in accordance with various aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive an indication of a set of tracking reference signal symbols, the set of tracking reference signal symbols includes one or more subset of tracking reference signal symbols, each of the one or more subset of tracking reference signal symbols includes at least two or more tracking reference signal symbols. The operations of 1605 may be performed according to the methods described herein. In some examples, aspects of the operations of 1605 may be performed by a message component as described with reference to FIGS. 6 through 9.

At 1610, the UE may determine a number of tracking reference signal symbols based on the received indication. The operations of 1610 may be performed according to the methods described herein. In some examples, aspects of the operations of 1610 may be performed by a symbol component as described with reference to FIGS. 6 through 9.

At 1615, the UE may enable a timer based on determining the number of tracking reference signal symbols. The operations of 1615 may be performed according to the methods described herein. In some examples, aspects of the operations of 1615 may be performed by a timer component as described with reference to FIGS. 6 through 9.

At 1620, the UE may measure a tracking reference signal based on the adjusted number of tracking reference signal symbols. The operations of 1620 may be performed according to the methods described herein. In some examples, aspects of the operations of 1620 may be performed by a channel component as described with reference to FIGS. 6 through 9.

Figure 17:
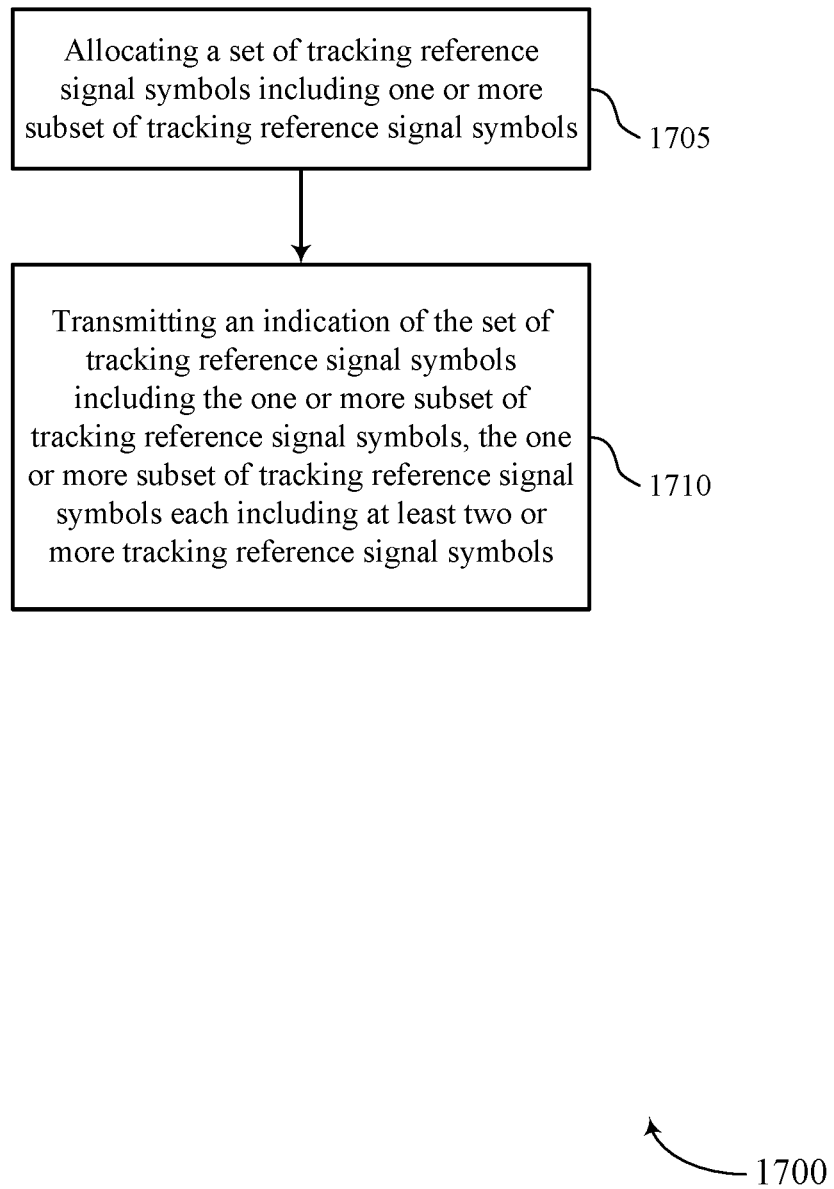

FIG. 17 shows a flowchart illustrating a method 1700 that supports techniques for adapting a number of tracking reference signal symbols in accordance with various aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may allocate a set of tracking reference signal symbols including one or more subset of tracking reference signal symbols. The operations of 1705 may be performed according to the methods described herein. In some examples, aspects of the operations of 1705 may be performed by a symbol component as described with reference to FIGS. 10 through 13.

At 1710, the base station may transmit an indication of the set of tracking reference signal symbols including the one or more subset of tracking reference signal symbols, the one or more subset of tracking reference signal symbols each including at least two or more tracking reference signal symbols. The operations of 1710 may be performed according to the methods described herein. In some examples, aspects of the operations of 1710 may be performed by a message component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving an indication of a set of tracking reference signal symbols, the set of tracking reference signal symbols includes one or more subset of tracking reference signal symbols, each of the one or more subset of tracking reference signal symbols includes at least two or more tracking reference signal symbols; determining a number of tracking reference signal symbols based at least in part on the received indication; and measuring a tracking reference signal based at least in part on the adjusted number of tracking reference signal symbols.

Aspect 2: The method of aspect 1, further comprising: determining a symbol index associated with each tracking reference signal symbol in the adjusted number of tracking reference signal symbols within a slot having a symbol index ranging from 0 to 14.

Aspect 3: The method of aspect 2, wherein the set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

Aspect 4: The method of any of aspects 1 through 3, wherein the set of tracking reference signal symbols includes a union of at least two subset of tracking reference signal symbols.

Aspect 5: The method of aspect 4, wherein a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10.

Aspect 6: The method of aspect 4, wherein a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

Aspect 7: The method of any of aspects 1 through 6, further comprising: determining a bit value associated with the received indication; and selecting the one or more subset of tracking reference signal symbols based at least in part on the determined bit value associated with the received indication, the one or more subset of tracking reference signal symbols each including at least two or more tracking reference signal symbols, wherein determining the number of tracking reference signal symbols is based at least in part on the one or more selected subset of tracking reference signal symbols.

Aspect 8: The method of any of aspects 1 through 7, further comprising: switching from a primary tracking reference signal configuration to a secondary tracking reference signal configuration based at least in part on the indication, wherein measuring the tracking reference signal is based at least in part on switching from the primary tracking reference signal configuration to the secondary tracking reference signal configuration.

Aspect 9: The method of aspect 8, further comprising: determining one or more tracking reference signal parameters based at least in part on switching from the primary tracking reference signal configuration to the secondary tracking reference signal configuration, the one or more tracking reference signal parameters including a length of a tracking reference signal burst, a periodicity of the tracking reference signal burst, a number of symbols for a tracking reference signal transmission within a slot, a bandwidth part for the tracking reference signal transmission, a subcarrier spacing associated with the tracking reference signal transmission, or a symbol spacing associated with the tracking reference signal transmission, or any combination thereof, wherein measuring the tracking reference signal is based at least in part on the one or more determined tracking reference signal parameters.

Aspect 10: The method of any of aspects 1 through 9, further comprising: enabling a timer based at least in part on determining the number of tracking reference signal symbols.

Aspect 11: The method of aspect 10, further comprising: adjusting the number of tracking reference signal symbols to a default number of tracking reference signal symbols according to a default tracking reference signal configuration based at least in part on the timer lapsing.

Aspect 12: The method of any of aspects 1 through 10, further comprising: adjusting the number of tracking reference signal symbols to a default number of tracking reference signal symbols based at least in part on receiving a second indication.

Aspect 13: The method of any of aspects 1 through 12, further comprising: receiving a downlink control information message including the indication of the set of tracking reference signal symbols including the one or more subset of tracking reference signal symbols, wherein determining the number of tracking reference signal symbols is based at least in part on the received downlink control information message.

Aspect 14: The method of aspect 13, wherein the downlink control information message includes a UE-specific downlink control information message or a group common downlink control information message associated with a group of UEs.

Aspect 15: The method of any of aspects 1 through 12, further comprising: receiving a medium access control-control element message comprising the indication of the set of tracking reference signal symbols including the one or more subset of tracking reference signal symbols, wherein determining the number of tracking reference signal symbols is based at least in part on the received medium access control-control element message.

Aspect 16: The method of any of aspects 1 through 15, further comprising: receiving a radio resource control message including a default tracking reference signal configuration of a default set of tracking reference signal symbols, the default set of tracking reference signal symbols including the one or more subset of tracking reference signal symbols, the one or more subset of tracking reference signal symbols each including at least two or more tracking reference signal symbols, wherein determining the number of tracking reference signal symbols is based at least in part on the received indication and the default tracking reference signal configuration.

Aspect 17: The method of any of aspects 1 through 16, further comprising: determining a tracking reference signal coverage condition; transmitting a request message to increase the number of tracking reference signal symbols based at least in part on the determined tracking reference signal coverage condition; and receiving a response message including the indication based at least in part on the transmitted request message to increase the number of tracking reference signal symbols, wherein determining the number of tracking reference signal symbols is based at least in part on the received response message including the indication.

Aspect 18: The method of any of aspects 1 through 17, further comprising: determining a first number of tracking reference signal symbols based at least in part on a default tracking reference signal configuration; and determining a second number of tracking reference signal symbols based at least in part on the received indication, the first number of tracking reference signal symbols is different from the second number of tracking reference signal symbols, wherein measuring the tracking reference signal is based at least in part on the second number of tracking reference signal symbols.

Aspect 19: The method of aspect 18, wherein the second number of tracking reference signal symbols is greater than the first number of tracking reference signal symbols.

Aspect 20: A method for wireless communication at a base station, comprising: allocating a set of tracking reference signal symbols including one or more subset of tracking reference signal symbols; and transmitting an indication of the set of tracking reference signal symbols including the one or more subset of tracking reference signal symbols, the one or more subset of tracking reference signal symbols each including at least two or more tracking reference signal symbols.

Aspect 21: The method of aspect 20, wherein the set of tracking reference signal symbols includes a union of at least two subset of tracking reference signal symbols.

Aspect 22: The method of aspect 21, wherein a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10.

Aspect 23: The method of aspect 21, wherein a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

Aspect 24: The method of any of aspects 20 through 23, further comprising: assigning a bit value to the indication, the bit value corresponding to the one or more subset of tracking reference signal symbols.

Aspect 25: The method of any of aspects 20 through 24, further comprising: transmitting a downlink control information message including the indication of the set of tracking reference signal symbols including the one or more subset of tracking reference signal symbols.

Aspect 26: The method of aspect 25, wherein the downlink control information message includes a UE-specific downlink control information message or a group common downlink control information message associated with a group of UEs.

Aspect 27: The method of any of aspects 20 through 24, further comprising: transmitting a medium access control-control element message comprising the indication of the set of tracking reference signal symbols including the one or more subset of tracking reference signal symbols.

Aspect 28: The method of any of aspects 20 through 27, further comprising: transmitting a radio resource control message including a default tracking reference signal configuration of a default set of tracking reference signal symbols, the default set of tracking reference signal symbols including the one or more subset of tracking reference signal symbols.

Aspect 29: The method of any of aspects 20 through 28, further comprising: receiving a request message to increase a number of tracking reference signal symbols based at least in part on a tracking reference signal coverage condition, wherein allocating the set of tracking reference signal symbols is based at least in part on the received request message; and transmitting a response message including the indication based at least in part on the received request message to increase the number of tracking reference signal symbols.

Aspect 30: The method of any of aspects 20 through 28, further comprising: receiving a request message to decrease a number of tracking reference signal symbols based at least in part on a tracking reference signal coverage condition, wherein allocating the set of tracking reference signal symbols is based at least in part on the received request message; and transmitting a response message including the indication based at least in part on the received request message to decrease the number of tracking reference signal symbols.

Aspect 31: The method of any of aspects 20 through 30, wherein the set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

Aspect 32: An apparatus for wireless communication at a UE, comprising a processor; memory coupled with the processor; and instructions stored in the memory and executable by the processor to cause the apparatus to perform a method of any of aspects 1 through 19.

Aspect 33: An apparatus for wireless communication at a UE, comprising at least one means for performing a method of any of aspects 1 through 19.

Aspect 34: A non-transitory computer-readable medium storing code for wireless communication at a UE, the code comprising instructions executable by a processor to perform a method of any of aspects 1 through 19.

Aspect 35: An apparatus for wireless communication at a base station, comprising a processor; memory coupled with the processor; and instructions stored in the memory and executable by the processor to cause the apparatus to perform a method of any of aspects 20 through 31.

Aspect 36: An apparatus for wireless communication at a base station, comprising at least one means for performing a method of any of aspects 20 through 31.

Aspect 37: A non-transitory computer-readable medium storing code for wireless communication at a base station, the code comprising instructions executable by a processor to perform a method of any of aspects 20 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving an indication of a set of tracking reference signal symbols, the set of tracking reference signal symbols includes one or more subset of tracking reference signal symbols, each of the one or more subset of tracking reference signal symbols includes at least two or more tracking reference signal symbols;
    determining a number of tracking reference signal symbols based at least in part on the received indication;
    measuring a tracking reference signal based at least in part on an adjusted number of tracking reference signal symbols; and
    identifying a symbol index associated with each tracking reference signal symbol in the adjusted number of tracking reference signal symbols within a slot having a symbol index ranging from 0 to 14.

2. The method of claim 1, wherein the set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

3. The method of claim 1, wherein the set of tracking reference signal symbols includes a union of at least two subset of tracking reference signal symbols.

4. The method of claim 3, wherein a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10.

5. The method of claim 3, wherein a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

6. The method of claim 1, further comprising:
    determining a bit value associated with the received indication; and
    selecting the one or more subset of tracking reference signal symbols based at least in part on the determined bit value associated with the received indication, the one or more subset of tracking reference signal symbols each including the at least two or more tracking reference signal symbols, wherein determining the number of tracking reference signal symbols is based at least in part on the one or more selected subset of tracking reference signal symbols.

7. The method of claim 1, further comprising:
    switching from a primary tracking reference signal configuration to a secondary tracking reference signal configuration based at least in part on the indication, wherein measuring the tracking reference signal is based at least in part on switching from the primary tracking reference signal configuration to the secondary tracking reference signal configuration.

8. The method of claim 7, further comprising:
    determining one or more tracking reference signal parameters based at least in part on switching from the primary tracking reference signal configuration to the secondary tracking reference signal configuration, the one or more tracking reference signal parameters including a length of a tracking reference signal burst, a periodicity of the tracking reference signal burst, a number of symbols for a tracking reference signal transmission within a slot, a bandwidth part for the tracking reference signal transmission, a subcarrier spacing associated with the tracking reference signal transmission, or a symbol spacing associated with the tracking reference signal transmission, or any combination thereof, wherein measuring the tracking reference signal is based at least in part on the one or more determined tracking reference signal parameters.

9. The method of claim 1, further comprising:
enabling a timer based at least in part on determining the number of tracking reference signal symbols.

10. The method of claim 9, further comprising:
adjusting the number of tracking reference signal symbols to a default number of tracking reference signal symbols according to a default tracking reference signal configuration based at least in part on the timer lapsing.

11. The method of claim 1, further comprising:
adjusting the number of tracking reference signal symbols to a default number of tracking reference signal symbols based at least in part on receiving a second indication.

12. The method of claim 1, further comprising:
receiving a downlink control information message including the indication of the set of tracking reference signal symbols including the one or more subset of tracking reference signal symbols, wherein determining the number of tracking reference signal symbols is based at least in part on the received downlink control information message.

13. The method of claim 12, wherein the downlink control information message includes a UE-specific downlink control information message or a group common downlink control information message associated with a group of UEs.

14. The method of claim 1, further comprising:
receiving a medium access control-control element message comprising the indication of the set of tracking reference signal symbols including the one or more subset of tracking reference signal symbols, wherein determining the number of tracking reference signal symbols is based at least in part on the received medium access control-control element message.

15. An apparatus for wireless communication, comprising:
a processor,
memory coupled with the processor; and
instructions stored in the memory and executable by the processor to cause the apparatus to:
receive an indication of a set of tracking reference signal symbols, the set of tracking reference signal symbols includes one or more subset of tracking reference signal symbols, each of the one or more subset of tracking reference signal symbols includes at least two or more tracking reference signal symbols;
determine a number of tracking reference signal symbols based at least in part on the received indication;
measure a tracking reference signal based at least in part on an adjusted number of tracking reference signal symbols; and
identifying a symbol index associated with each tracking reference signal symbol in the adjusted number of tracking reference signal symbols within a slot having a symbol index ranging from 0 to 14.

16. The apparatus of claim 15, wherein the set of tracking reference signal symbols or the one or more subset of tracking reference signal symbols includes a first tracking reference signal symbol corresponding to a symbol index 4, a second tracking reference signal symbol corresponding to a symbol index 8, a third tracking reference signal symbol corresponding to a symbol index 5, a fourth tracking reference signal symbol corresponding to a symbol index 9, a fifth tracking reference signal symbol corresponding to a symbol index 6, or a sixth tracking reference signal symbol corresponding to a symbol index 10, or any combination thereof.

17. The apparatus of claim 15, wherein the set of tracking reference signal symbols includes a union of at least two subset of tracking reference signal symbols.

18. The apparatus of claim 17, wherein a first subset of tracking reference signal symbols of the at least two subset of tracking reference signal symbols includes a first tracking reference signal symbol corresponding to a symbol index 4 and a second tracking reference signal symbol corresponding to a symbol index 8, and a second subset of tracking reference signal symbols of the at least two subset of tracking reference signal symbols includes a first tracking reference signal symbol corresponding to a symbol index 5 or a symbol index 6 and a second tracking reference signal symbol corresponding to a symbol index 9 or a symbol index 10.

19. The apparatus of claim 17, wherein a first subset of tracking reference signal symbols of the at least two subset of tracking reference signal symbols includes a first tracking reference signal symbol corresponding to a symbol index 5 and a second tracking reference signal symbol corresponding to a symbol index 9, and a second subset of tracking reference signal symbols of the at least two subset of tracking reference signal symbols includes a first tracking reference signal symbol corresponding to a symbol index 4 or a symbol index 6 and a second tracking reference signal symbol corresponding to a symbol index 8 or a symbol index 10.

20. The apparatus of claim 15, further comprising:
determining a bit value associated with the received indication; and
selecting the one or more subset of tracking reference signal symbols based at least in part on the determined bit value associated with the received indication, the one or more subset of tracking reference signal symbols each including the at least two or more tracking reference signal symbols, wherein determining the number of tracking reference signal symbols is based at least in part on the one or more selected subset of tracking reference signal symbols.

21. The apparatus of claim 15, further comprising:
switching from a primary tracking reference signal configuration to a secondary tracking reference signal configuration based at least in part on the indication, wherein measuring the tracking reference signal is based at least in part on switching from the primary tracking reference signal configuration to the secondary tracking reference signal configuration.

22. The apparatus of claim 21, further comprising:
determining one or more tracking reference signal parameters based at least in part on switching from the primary tracking reference signal configuration to the secondary tracking reference signal configuration, the one or more tracking reference signal parameters including a length of a tracking reference signal burst, a periodicity of the tracking reference signal burst, a number of symbols for a tracking reference signal transmission within a slot, a bandwidth part for the tracking reference signal transmission, a subcarrier spacing associated with the tracking reference signal transmission, or a symbol spacing associated with the tracking reference signal transmission, or any combination thereof, wherein measuring the tracking reference signal is based at least in part on the one or more determined tracking reference signal parameters.

23. The apparatus of claim 15, further comprising:
enabling a timer based at least in part on determining the number of tracking reference signal symbols.

24. The apparatus of claim 23, further comprising:
adjusting the number of tracking reference signal symbols to a default number of tracking reference signal symbols according to a default tracking reference signal configuration based at least in part on the timer lapsing.

25. The apparatus of claim 15, further comprising:
adjusting the number of tracking reference signal symbols to a default number of tracking reference signal symbols based at least in part on receiving a second indication.

26. The apparatus of claim 15, further comprising:
receiving a downlink control information message including the indication of the set of tracking reference signal symbols including the one or more subset of tracking reference signal symbols, wherein determining the number of tracking reference signal symbols is based at least in part on the received downlink control information message.

27. The apparatus of claim 26, wherein the downlink control information message includes a UE-specific downlink control information message or a group common downlink control information message associated with a group of UEs.

28. The apparatus of claim 15, further comprising:
receiving a medium access control-control element message comprising the indication of the set of tracking reference signal symbols including the one or more subset of tracking reference signal symbols, wherein determining the number of tracking reference signal symbols is based at least in part on the received medium access control-control element message.

* * * * *